United States Patent [19]

Han et al.

[11] Patent Number: 5,568,412
[45] Date of Patent: Oct. 22, 1996

[54] ROUNDING-OFF METHOD AND APPARATUS OF FLOATING POINT ARITHMETIC APPARATUS FOR ADDITION/SUBTRACTION

[75] Inventors: Tack D. Han; Shi W. Lee; Woo C. Park, all of Seoul, Rep. of Korea

[73] Assignee: Goldstar Company, Limited, Seoul, Rep. of Korea

[21] Appl. No.: 350,981

[22] Filed: Nov. 29, 1994

[30] Foreign Application Priority Data

Apr. 29, 1994 [KR] Rep. of Korea ............... 9331/1994

[51] Int. Cl.$^6$ ............................... G06F 7/38; G06F 7/50
[52] U.S. Cl. ........................................ 364/748; 364/745
[58] Field of Search ............................... 364/745, 715.04, 364/748

[56] References Cited

U.S. PATENT DOCUMENTS 4,562,553  12/1985  Mattedi et al. ..................... 364/745
4,896,286  1/1990   Ueda ................................. 364/748
4,926,370  5/1990   Brown et al. ....................... 364/748
5,276,634  1/1994   Suzuki et al. ...................... 364/745

Primary Examiner—David H. Malzahn

[57] ABSTRACT

An apparatus and method for arithmetic addition/subtraction of first and second floating point operands, each having a fraction portion and an exponent, includes an alignment circuit, an addition/subtraction-and-rounding-off circuit, and a normalization circuit. The alignment circuit aligns the fraction portions of the first and second operands based on a difference of their exponents obtained by comparing the respective exponents of the first and second operands. The addition/subtraction-and-rounding-off circuit performs at least two addition/subtraction operations between the aligned fraction portions of the first and second operands, and selectively outputs a result value of one of the addition/subtraction operations as a rounded-off result value in response to a rounding-off control signal so that the rounded-off result value is a rounded-off value of addition/subtraction of the fraction portions of the first and second operands. The normalization circuit normalizes the rounded-off result value to output a final result.

51 Claims, 9 Drawing Sheets

FIG. 1
CONVENTIONAL ART
FIG. 2
CONVENTIONAL ART
FIG. 3
CONVENTIONAL ART
0.00000000100101010101010101 01010010
                                    LSB ⎯⎯⏌         ⎣⎯⎯⎯⎯ STICKY BIT
                                                                        : 1(or)
                              GUARD BIT ⎯⎯⎯⎯⏌   ⎣⎯⎯ ROUND BIT : 1
                                   :0

FIG.10

| | | G R Sy +1 1 1 | INVERSE (G1R1Sy1) | ROUND OFF INCREMENT BIT | | | ROUND OFF MUX CONTROL | |
|---|---|---|---|---|---|---|---|---|
| | | | | Sn−1=0 | Sn−1=1 | | Sn−1=0 | Sn−1=1 |
| G R Sy | V1 | G1R1Sy1 | G2R2Sy2 | V2 | So | V3 | V1+V2 | V1+V3 |
| 0 0 0 | 0 | 1 1 1 | 0 0 0 | 0 0 | 0 | 0 | 0 | 0 |
| 0 0 1 | 1 | 0 0 0 | 1 1 1 | 1 0 | 1 | 0 | 0 | 0 |
| 0 1 0 | 1 | 0 0 1 | 1 1 0 | 1 0 | 1 | 0 | 0 | 0 |
| 0 1 1 | 1 | 0 1 0 | 1 0 1 | 0 1 | 1 | 0 | 1 | 0 |
| 1 0 0 | 1 | 0 1 1 | 1 0 0 | 0 1 | So' | 0 | 1 | So |
| 1 0 1 | 1 | 1 0 0 | 0 1 1 | 0 1 | 0 | 0 | 1 | 1 |
| 1 1 0 | 1 | 1 0 1 | 0 1 0 | 0 0 | 0 | 0 | 1 | 1 |
| 1 1 1 | 1 | 1 1 0 | 0 0 1 | 0 0 | 0 | 0 | 1 | 1 |

FIG.11

| | | G R Sy +1 1 1 | INVERSE (G1R1Sy1) | ROUND OFF INCREMENT BIT | | | ROUND OFF MUX CONTROL | |
|---|---|---|---|---|---|---|---|---|
| | | | | Sn−1=0 | Sn−1=1 | | Sn−1=0 | Sn−1=1 |
| G R Sy | V1 | G1R1Sy1 | G2R2Sy2 | V2 | So | V3 | V1+V2 | V1+V3 |
| 0 0 0 | 0 | 1 1 1 | 0 0 0 | 0 0 | 0 | 0 | 0 | 0 |
| 0 0 1 | 1 | 0 0 0 | 1 1 1 | 0 1 | 0 | 0 | 1 | 1 |
| 0 1 0 | 1 | 0 0 1 | 1 1 0 | 0 1 | 0 | 0 | 1 | 1 |
| 0 1 1 | 1 | 0 1 0 | 1 0 1 | 0 1 | 0 | 0 | 1 | 1 |
| 1 0 0 | 1 | 0 1 1 | 1 0 0 | 0 1 | 0 | 0 | 1 | 1 |
| 1 0 1 | 1 | 1 0 0 | 0 1 1 | 0 0 | 0 | 0 | 1 | 1 |
| 1 1 0 | 1 | 1 0 1 | 0 1 0 | 0 0 | 0 | 0 | 1 | 1 |
| 1 1 1 | 1 | 1 1 0 | 0 0 1 | 0 0 | 0 | 0 | 1 | 1 |

FIG.12A

| | | | G R Sy<br>+1 1 1 | INVERSE<br>(G1R1Sy1) | ROUND OFF<br>INCREMENT BIT | | ROUND OFF<br>MUX CONTROL | |
|---|---|---|---|---|---|---|---|---|
| | | | | | Sn-1=0 | Sn-1=1 | Sn-1=0 | Sn-1=1 |
| G R Sy | V1 | G1R1Sy1 | G2R2Sy2 | V2 So | V3 | V1+V2 | V1+V3 |

| G | R | Sy | V1 | G1R1Sy1 | G2R2Sy2 | V2 So | V3 | V1+V2 | V1+V3 |
|---|---|----|----|---------|---------|-------|----|-------|-------|
| 0 | 0 | 0  | 0  | 1 1 1   | 0 0 0   | 0 0   | 0  | 0     | 0     |
| 0 | 0 | 1  | 1  | 0 0 0   | 1 1 1   | 1 0   | 1  | 0     | 0     |
| 0 | 1 | 0  | 1  | 0 0 1   | 1 1 0   | 1 0   | 1  | 0     | 0     |
| 0 | 1 | 1  | 1  | 0 1 0   | 1 0 1   | 1 0   | 1  | 0     | 0     |
| 1 | 0 | 0  | 1  | 0 1 1   | 1 0 0   | 0 1   | 1  | 1     | 0     |
| 1 | 0 | 1  | 1  | 1 0 0   | 0 1 1   | 0 1   | 1  | 1     | 0     |
| 1 | 1 | 0  | 1  | 1 0 1   | 0 1 0   | 0 1   | 1  | 1     | 0     |
| 1 | 1 | 1  | 1  | 1 1 0   | 0 0 1   | 0 1   | 1  | 1     | 0     |

FIG.12B

| | | | G R Sy<br>+1 1 1 | INVERSE<br>(G1R1Sy1) | ROUND OFF<br>INCREMENT BIT | | ROUND OFF<br>MUX CONTROL | |
|---|---|---|---|---|---|---|---|---|
| | | | | | Sn-1=0 | Sn-1=1 | Sn-1=0 | Sn-1=1 |
| G R Sy | V1 | G1R1Sy1 | G2R2Sy2 | V2 So | V3 | V1+V2 | V1+V3 |

| G | R | Sy | V1 | G1R1Sy1 | G2R2Sy2 | V2 So | V3 | V1+V2 | V1+V3 |
|---|---|----|----|---------|---------|-------|----|-------|-------|
| 0 | 0 | 0  | 0  | 1 1 1   | 0 0 0   | 0 0   | 0  | 0     | 0     |
| 0 | 0 | 1  | 1  | 0 0 0   | 1 1 1   | 0 1   | 0  | 1     | 1     |
| 0 | 1 | 0  | 1  | 0 0 1   | 1 1 0   | 0 1   | 0  | 1     | 1     |
| 0 | 1 | 1  | 1  | 0 1 0   | 1 0 1   | 0 1   | 0  | 1     | 1     |
| 1 | 0 | 0  | 1  | 0 1 1   | 1 0 0   | 0 1   | 0  | 1     | 1     |
| 1 | 0 | 1  | 1  | 1 0 0   | 0 1 1   | 0 0   | 0  | 1     | 1     |
| 1 | 1 | 0  | 1  | 1 0 1   | 0 1 0   | 0 0   | 0  | 1     | 1     |
| 1 | 1 | 1  | 1  | 1 1 0   | 0 0 1   | 0 0   | 0  | 1     | 1     |

ROUNDING-OFF METHOD AND APPARATUS OF FLOATING POINT ARITHMETIC APPARATUS FOR ADDITION/SUBTRACTION

BACKGROUND OF THE INVENTION

1. Field of the Invention

The present invention relates to a floating point operation method and apparatus for in parallel performing addition/subtraction operation and rounding off in four rounding-off methods which are all IEEE's standards.

2. Description of the Prior Art

Generally, a floating point arithmetic unit(FPU) is necessarily used in graphic accelerators, DSP(Digital Signal Processor) and computer systems with high performance. As chip integration capability increases due to advances in semiconductor technology, it has become possible for the floating point arithmetic unit (FPU) to be put on a single chip together with the CPU, allowing the FPU to exceed its original supplementary function and is now the principal element of the main arithmetic unit. In case that the floating point arithmetic unit is built on a single chip, only some primary arithmetic units such as an adder, subtractor and multiplier are built on the chip due to the limited space of the CPU, and additional software is used for further operation. Therefore, the conventional floating point addition/subtraction operation greatly influences the entire operation of the floating point.

Among the four steps of exponent alignment, addition/subtraction operation, normalization and rounding-off, the rounding-off can be executed by four methods according to the IEEE's standard No. 754–1985: Round to Nearest, Round to Zero, Round to Positive Infinity and Round to Negative Infinity see:"Standard for Binary Floating-Point Arithmetic," ANSI/IEEE Std. 754–1985, The Institute of Electrical and Electronic Engineers, Inc., New York, N.Y., 1985, which is hereby incorporated herein by reference thereto.

In an expression of the floating point number, there are two types of 32 bits single precision shown in FIG. 1 and 64 bits double precision shown in FIG. 2.

The single precision type consists of a sign bit s of 1 bit, an exponent e of 8 bits and a fraction f of 23 bits. The double precision type consists of a sign bit s of 1 bit, an exponent e of 11 bits and a fraction of 52 bits.

An arithmetic unit according to the IEEE's standard is expressed as follows.

$$A=(-1)^s*1.f*2^{e-bias}$$

Where s denotes a sign bit for a fraction f, f denotes a fraction expressed in an absolute value, and e denotes an exponent expressed in a bias.

The operations of floating point use a bias conception in order to simplify the exponent process.

The biased exponent is the sum of the exponent and a constant(bias) chosen to make the biased exponent's range nonnegative(hereinafter, the term "Exponent" refers to a biased exponent).

The bias in the single precision is 127. The bias in the double precision is 1023. The normalized fractions means that the MSB(Most Significant Bit) is 1 and in an expression of floating point number, here the MSB can be omitted.

For a proper rounding-off under the IEEE's standard, there should be presented an information of the data loss of the fraction f in an alignment of the exponent.

For the sake of Rounding-off, there are defined three types of bits: Guard bit, Round bit and Sticky bit.

The Guard bit G becomes the MSB of the information which will be lost, and has a weight value less than that of the LSB. The Round bit is the bit of lost information next to the Guard bit. The Sticky bit is a logically ORed operation value for the lost information bits excluding the Guard bit G and the Round bit R.

The Guard bit G is for determining whether the lost information is less than, greater than or equal to a half. As a result of subtraction of the fraction, if the MSB is zero, one shift is executed to the MSB. At this time, as the Guard bit G shifts to the left, it becomes the LSB.

Accordingly, to perform a rounding-off bits are needed for executing the role of the Guard bit G after the shift to the left by one bit with (i.e., the the Round bit R is needed).

Thus, when a subtraction results in the MSB being zero, a one bit shift is executed to the left, at this time, the Guard bit G becomes the LSB and the Round bit R becomes the Guard bit G, thus executing rounding-off. This process is referred to as increment.

When round-off with only the Guard bit G and the Round bit R cannot be performed, information whose weight is less than (i.e. to the right of that of the Round bit R is needed (i.e. the sticky bit is needed). For example, when the Guard bit G is 1, and the Round bit is zero, at this time, the increment and truncation have an equal error.

When the Guard bit is 1, the Round bit is 0 and the Sticky bit Sy is 1, the increment is selected rather than the truncation because at least one bit is "1" in the truncated fraction f.

FIG. 3, as described above, shows that the normalized operand in the IEEE's standard for single precision when the Guard bit G, the Round bit R and the Sticky bit Sy are shifted to the right by 8 bits.

The Round to Nearest is a type of round off for decreasing errors, and in case of the object of the rounding off being same to both directions, it is the method of rounding off the LSB to zero. Among the four methods, it is the best to use.

The Round to Zero is the method of rounding off to zero, and when rounding off it is truncation performed despite the value of the Guard bit G, the Round bit R and the Sticky bit Sy.

The Round to Positive Infinity is the method of rounding off to positive infinity and to make an increment when (1) at least one bit is 1 among the Guard bit G, the Round bit R and the Sticky bit By and (2) the number to be rounded off is positive.

The Round to Negative Infinity is the method of rounding off to a negative infinity and to round off when (1) at least one bit is 1 among the Guard bit G, the Round bit R and (2) the Sticky bit Sy and the number to be rounded off is negative.

As described above, after the exponent alignment, the addition/subtraction of the fraction, and the normalization at the floating point addition/subtraction operation, the rounding-off result of the four rounding-off methods for the LSB, G, R, and Sy are shown in the following tables.

1. Round to Nearest

| LSB | Guard bit | Round bit | Sticky bit | Round-off Result |
|-----|-----------|-----------|------------|------------------|
| 0 | 0 | 0 | 0 | Truncation |
| 0 | 0 | 0 | 1 | Truncation |
| 0 | 0 | 1 | 0 | Truncation |
| 0 | 0 | 1 | 1 | Truncation |

1. Round to Nearest

| LSB | Guard bit | Round bit | Sticky bit | Round-off Result |
|-----|-----------|-----------|------------|------------------|
| 0 | 1 | 0 | 0 | Truncation |
| 0 | 1 | 0 | 1 | Increment |
| 0 | 1 | 1 | 0 | Increment |
| 0 | 1 | 1 | 1 | Increment |
| 1 | 0 | 0 | 0 | Truncation |
| 1 | 0 | 0 | 1 | Truncation |
| 1 | 0 | 1 | 0 | Truncation |
| 1 | 0 | 1 | 1 | Truncation |
| 1 | 1 | 0 | 0 | Increment |
| 1 | 1 | 0 | 1 | Increment |
| 1 | 1 | 1 | 0 | Increment |
| 1 | 1 | 1 | 1 | Increment |

2. Round to Zero

| Guard bit | Round bit | Sticky bit | Round off result |
|-----------|-----------|------------|------------------|
| 0 | 0 | 0 | Truncation |
| 0 | 0 | 1 | Truncation |
| 0 | 1 | 0 | Truncation |
| 0 | 1 | 1 | Truncation |
| 1 | 0 | 0 | Truncation |
| 1 | 0 | 1 | Truncation |
| 1 | 1 | 0 | Truncation |
| 1 | 1 | 1 | Truncation |

3. Round to Positive Infinity

| Sign | Guard bit | Round bit | Sticky bit | Round-off Result |
|------|-----------|-----------|------------|------------------|
| 0 | 0 | 0 | 0 | Truncation |
| 0 | 0 | 0 | 1 | Increment |
| 0 | 0 | 1 | 0 | Increment |
| 0 | 0 | 1 | 1 | Increment |
| 0 | 1 | 0 | 0 | Increment |
| 0 | 1 | 0 | 1 | Increment |
| 0 | 1 | 1 | 0 | Increment |
| 0 | 1 | 1 | 1 | Increment |
| 1 | 0 | 0 | 0 | Truncation |
| 1 | 0 | 0 | 0 | Truncation |
| 1 | 0 | 1 | 0 | Truncation |
| 1 | 0 | 1 | 1 | Truncation |
| 1 | 1 | 0 | 0 | Truncation |
| 1 | 1 | 0 | 1 | Truncation |
| 1 | 1 | 1 | 0 | Truncation |
| 1 | 1 | 1 | 1 | Truncation |

4. Round to Negative Infinity

| Sign | Guard bit | Round bit | Sticky bit | Round-off Result |
|------|-----------|-----------|------------|------------------|
| 0 | 0 | 0 | 0 | Truncation |
| 0 | 0 | 0 | 1 | Truncation |
| 0 | 0 | 1 | 0 | Truncation |
| 0 | 0 | 1 | 1 | Truncation |
| 0 | 1 | 0 | 0 | Truncation |
| 0 | 1 | 0 | 1 | Truncation |
| 0 | 1 | 1 | 0 | Truncation |
| 0 | 1 | 1 | 1 | Truncation |
| 1 | 0 | 0 | 0 | Truncation |
| 1 | 0 | 0 | 1 | Increment |
| 1 | 0 | 1 | 0 | Increment |
| 1 | 0 | 1 | 1 | Increment |
| 1 | 1 | 0 | 0 | Increment |
| 1 | 1 | 0 | 1 | Increment |
| 1 | 1 | 1 | 0 | Increment |
| 1 | 1 | 1 | 1 | Increment |

In addition, the conventional floating point addition/subtraction arithmetic unit, as described above, processes the exponent alignment, addition/subtraction operation, normalization and rounding-off.

Here, during the floating point addition/subtraction operation, the two operands are positive.

Accordingly, when the operand A is positive and the operand B is negative, the addition operation between both operands A and B is a subtraction between positive A and positive B since the operand B is negative.

To begin with, the alignment steps are:

1. compare an exponent 2 of the two operands, computing a difference and transferring the larger exponent to the next step, and 2. shift the computed difference from the fraction f of the operand having the lesser exponent e to the right.

Second, the addition/subtraction operation steps are:

3. perform the addition/subtraction operation in the fraction f. It is computed in a form of 2's complement, and 4. change into a positive one, in case the result of operation is negative. At this time, in the case of a subtraction and if a result value is negative, then after subtraction the value needs to be converted into the absolute value.

Third, the normalization steps are:

5. compute the number of leading zero from a result, and 6. execute the normalization.

In case of addition, it means that one bit is shifted to the right and 1 is added to the exponent 2 when a carry of an overflow takes place. In case of subtraction, the fraction f after an operation is shifted by a number of a leading zero to the left and the number of the leading zero is subtracted from the exponent.

Fourth, the rounding-of steps are:

7. perform a rounding-off operation with the guard bit G, the Round bit R and the Sticky bit Sy, and 8. re-normalize when an overflow occurs from a result value of the rounding-off operation. Thus, the fraction f is shifted to the right by 1 bit and the exponent increases by 1.

U.S. Pat. No. 4,896,286 as shown in FIG. 4 discloses a conventional floating point addition/subtraction arithmetic unit partially changed through a characteristic of the addition/subtraction in the fraction.

First, the characteristic of the addition/subtraction in the fraction will be explained and then the floating point addition/subtraction arithmetic unit using the characteristics will be explained, respectively.

Referring to FIG. 4, the floating point addition/subtraction operation consists of six steps: an exponent alignment, an addition/subtraction operation in the fraction, an absolute value computation, a normalization, a rounding-off and an overflow process.

In an addition of the addition/subtraction operations in the fraction, when the two exponents are the same, the result of an addition operation is positive, so that a floating point addition operation can be executed through the exponent alignment, addition operation, normalization, rounding-off and overflow process.

In a subtraction of the addition/subtraction operations, bit G, the Round bit R and the Sticky bit Sy which are needed in a rounding-off process are all zero, so that the floating point subtraction operation will be executed by only an exponent alignment, subtraction operation in the fraction, absolute value computation and normalization.

When there is a difference in the exponent, in a structure of subtracting a smaller number from a larger number, a result value of the subtraction is positive. Therefore, when the exponents of the two operands are different from each other, the result value of an addition/subtraction operation is positive, so that the floating point addition/subtraction operation will be executed by an exponent alignment, addition/subtraction operation in the fraction, normalization, rounding-off process and overflow process.

Referring to FIG. 4, there is shown a schematic configuration of a conventional floating point arithmetic unit. The floating point addition/subtraction operation is executed through the following four steps.

For performing the four steps there is provided the data alignment circuit 10, the addition/subtraction operation circuit 11, the normalization circuit 12, and the rounding-off circuit 13 and the overflow processing circuit 14.

Here, the data alignment circuit 10 is provided for shifting the fraction of the operand having smaller exponent obtained from the computed difference by comparing the value of the biased exponent, to the right by the difference of the exponent, thus aligning them.

The addition/subtraction operation circuit 11 is provided for adding or subtracting the two operands from the data alignment circuit 10 and making the negative positive during the subtraction of the fraction.

The normalization circuit 12 includes a shifter for shifting the fraction. The shifter shifts the fraction to the right during the overflow of the fraction in a time of addition at the addition/subtraction operation circuit 11, or shifts the fraction to the left by the number of leading zero in the subtraction, and adjusts the exponent.

The rounding-off circuit 13 and the overflow circuit 14 are provided for performing the rounding-off with the LSB of the fraction, the Guard bit, the Round bit, and the Sticky bit, which are normalized through the normalization circuit 12, and for normalizing the 1 bit in case of the overflow occurred due to the rounding-off process.

The data alignment circuit 10 includes first and second registers 40 and 41, a first subtractor 42, a first multiplexer 43, a second multiplexer 44, a first shifter 45, a third multiplexer 46 and a fourth multiplexer 47.

The first and second registers 40 and 41 include the two floating point numbers having sign bits S1 and S2, exponents e1 and e2, and fractions f1 and f2. The first subtractor 42 generates a difference signal ed, a borrow signal eb and an equality signal ex by subtracting the exponent e2 of the second register 41 from the exponent e1 of the first register 40. The first multiplexer 43 selectively outputs between the exponent e1 from the first register 40 and exponent e2 from the second register 41 according to the borrow signal eb generated by the first subtractor 42. The second multiplexer 44 selectively outputs between the fraction f1 from the first register 40 and the fraction f2 from the second register 41 according to the difference signal ed generated by the first subtractor 42. The first shifter 45 shifts the fraction f1 or f2 selectively applied from the second multiplexer 44 by a difference signal ed. The third multiplexer 46 selectively outputs between the fraction f1 from the first register 40 and the output value of the first shifter 45 according to the borrow signal eb generated at the first subtractor 42. The fourth multiplexer 47 selectively outputs between an output value from the first shift 45 and the fraction f2 from the second register 41 according to the borrow signal eb generated at the first subtractor 42.

The addition/subtraction operation circuit 11 includes first and second invertors 48 and 49 and first adder 50. The first and second invertors 48 and 49 invert an output selectively inputted from the third and fourth multiplexers 46 and 47 by receiving control signals CPL1 and CPL2 generated at the main control unit 61 according to an arithmetic mode to be inputted. The first adder 50 adds a value inverted at the first and second invertors 48 and 49.

The normalization circuit 13 includes a counter 51, a second shifter 52 and a second subtractor 53.

The counter 51 counts bits for normalizing a result of the first adder 50. The second shifter 52 generates the LSB, Guard bit G, Round bit R, and Sticky bit Sy, which are needed at a rounding-off process by shifting an output value of the first adder 50 by a value counted at the counter 51.

The rounding-off circuit 13 includes a rounding-off controller 54, a third invertor 55, a fifth multiplexer 56 and a second adder 57.

The rounding-off controller 54 rounds off according to the rounding-off mode with the LSB, Guard bit G, Round bit R and Sticky bit Sy, which are obtained or generated from the shifter 52 under the control of the main control unit. The fifth multiplexer 56 selectively outputs an output value of the rounding-off controller 54 and the value 1 according to the control signal CPL3 generated at the main control circuit unit 61. The second adder 57 adds an output value of the third invertor 55 and the result value selected at the fifth multiplexer 56.

The overflow process circuit 14 includes an overflow detector 58 for detecting whether an output value of the second adder 57 is an overflow or not, a third shifter 59 for shifting a result value outputted from the second adder 57 according to a result detected at the overflow detector 58, and an incrementor 60 for increasing an output value of the second subtractor 53 according to a result detected at the overflow detector 58.

According to the conventional floating point arithmetic unit, when the exponents e1 and e2 are outputted from the first and second registers 40 and 41 in which the two floating points are stored, having sign bits s1 and s2, exponents e1 and e2, and fractions f1 and f2, the first subtractor 42 of the data alignment circuit 10 subtracts an exponent e2 of the second register 41 from the exponent e1 of the first register 40, and generates the results which are a difference signal ed, a borrow signal eb, and an equality signal ex.

The borrow signal eb generated at the first subtractor 42 becomes zero when the exponent e1 is equal to or greater than the exponent e2, and on the contrary, it becomes 1 when exponent e1 is less than exponent e2 and is inputted into the first to fourth multiplexers 43, 44, 46 and 47 and the main control circuit unit 61.

When the borrow signal eb generated at the first subtractor 43 is zero, the multiplexer 43 selectively outputs exponent e1 applied from the first register 40, and when the borrow signal eb is 1 it selects the exponent e2 applied from the second register 41 and applies it to the second subtractor 53 of the normalization circuit.

Accordingly, the first multiplexer 43 selects the larger exponent.

When the borrow signal eb generated at the first subtractor 42 is 1, the second multiplexer 44 selectively outputs the fraction f1 of the first register 40, and when the borrow signal eb is zero, it selects the fraction f2 of the second register 41 and applies it to the first shifter 45.

Accordingly, the second multiplexer 44 selects the fraction of the smaller exponent.

The first shifter 45 shifts the fraction inputted from the second multiplexer 44 to the left by a difference signal ed generated at the first subtractor 42 and applies it to the third and fourth multiplexers 46 and 47.

When the borrow signal eb generated at the first subtractor 42 is zero, the third multiplexer 46 selects the fraction f1 of the first register 40 and inputs it into the first invertor 48 of the addition/subtraction operation circuit 11, and when the borrow signal is 1, it selects the output value shifted at the first shifter 45 and inputs it into the first invertor 48.

When the borrow signal eb generated at the first subtractor 42 is zero, the fourth multiplexer 47 selects an output value obtained by shifting at the first shifter 45 and applies it to the second invertor 49 of the addition/subtraction operation circuit 11, and when the borrow signal eb is 1, it selects the fraction applied from the second register 41 and inputs it into the second invertor 49.

The first and second invertors 48 and 49 of the addition/subtraction operation circuit 11 receive the control signals CPL1 and CPL2 generated at the main control circuit unit 61, invert the values outputted at the third and fourth multiplexer 46 and 47, respectively, and then applies them to the first adder 50. The first adder 50 adds the values inverted at the first and second invertor 48 and 49, applies them to the second shifter 52 and counter 51, which are the normalization circuit 12, and then applies control signals indicating a result of the positive and negative numbers.

The counter 51 of the normalization circuit 12 counts bits for normalization from a result of the first adder 50. At this time, when the number outputted from the first adder 50 is positive, the counter 51 counts the number to be shifted to the right, and when it is negative the counter 51 counts the number to be shifted to the left.

The second shifter 52, as a unit performing the normalization, shifts as much as the result value, counted at the counter 51, from the result value of the first adder 50 and applies the LSB, Guard bit G, Round bit R and Sticky bit Sy to the rounding-off controller 54 and the fifth multiplexer 56 which are the rounding-off circuit 13.

The second subtractor 53, as a unit adjusting the exponent, subtracts as much as the result value, counted at the counter 51, from the result value of the exponent selected at the first multiplexer 43 and applies the result to the incrementor 60 of the overflow process circuit 14.

The rounding-off controller 54 of the rounding-off circuit 13 rounds off by receiving the LSB, Guard bit G, Round bit R and Sticky bit Sy, which are needed in a rounding-off at the second shifter 52 of the normalization circuit 12 according to the rounding-off mode and then applies them to the fifth multiplexer 56. The fifth multiplexer 56 selects a result value at the rounding-off controller 54 and the value 1, and then inputs them into the second adder 57 according to the control signal CPL3 applied from the main controller 61.

In addition, the third invertor 55 of the rounding-off circuit 13 performs an inversion when a value generated from the second shifter 52 according to the control signal CPL3 applied from the main control circuit unit 61 is negative and inputs them into the second adder 57.

The second adder 57 adds a result value from the third invertor 55 and a result value from the fifth multiplexer 56 and applies the weight to the third shifter 59 and the overflow detector 58 The overflow detector 58 detects whether an output value of the second adder 57 is an overflow or not, and if an overflow occurred, it controls the third shifter 59 accordingly.

When an overflow is detected at the overflow detector 58, the third shifter 59 shifts a result value from the second adder 57 by 1 bit to the right and outputs the final fraction f. At the same time, the incrementor 60 increases by one to the result value from the second subtractor 53 and outputs the final exponent 2.

The main control circuit unit 61 controls the first to third invertors 48, 49 and 55 and the fifth multiplexer 56 with the sign bits s1 and s2 of the first and second register 40 and 41, a carry signal eb of the first subtractor 42, the equality signal ez and the output value of the first adder 50.

However, the floating point addition/subtraction arithmetic unit of FIG. 4 consists of the exponent alignment(data alignment), addition/subtraction operation, normalization and rounding-off. For the rounding-off process, it needs an additional adder and furthermore a re-normalization may occur due to the rounding-off.

U.S. Pat. No. 4,562,553 as shown in FIG. 5 discloses a schematic block diagram of the conventional floating point arithmetic unit capable of rounding off without using the incrementor by a prediction of the rounding-off during the floating point addition/subtraction.

As shown therein, there are provided a memory 100, an exponent comparator 101, a first mantissa selection memory 102, a second mantissa selection memory 103, a floating point adder circuit 104, an anticipating overflow and rounding-off circuit 105, an addition register 106, a leading zero counter 107, a mantissa normalization shift register 109, a mantissa register 111, an exponent correction circuit 108 and an exponent register 110.

In an arrangement described above, the memory 100 stores the two operands. The exponent comparator 101, as a data alignment circuit, outputs the results by comparing the exponents A and B applied from the memory 100. The first mantissa selection memory 102, as a data alignment circuit, shifts the two exponents applied from the memory 100 by a difference of the two exponents obtained from the exponent comparator 101 and generates Guard bit G, Round bit R and Sticky bit Sy which judges data of the rounding-off. The second mantissa selection memory 103 selects and stores a larger exponent between the two exponents A and B applied from the memory 100 according to the result signal obtained from the exponent comparator 101. The floating point adder circuit 104 subtracts or adds the exponent value inputted from the first and second mantissa selection memories 102 and 103, and adds or subtracts the number as much as the number obtained from the anticipating overflow and rounding-off circuit 105. The anticipating overflow and rounding-off circuit 105 detects the overflow from the floating point adder circuit 104 and processes in expectancy of the rounding-off with partial signals generated therein. The addition register 106, as a circuit of addition, stores numbers from the MSB to Guard bit G among output values obtained in a computation at the floating point adder circuit 104. The leading zero counter 107 is a normalization circuit for counting the values stored at the addition register 106 and outputted according to the overflow detected at the anticipating overflow and rounding-off circuit 105. The mantissa normalization shift register 109 shifts the output value of the addition register 106 by a value counted at the leading zero counter 107. The mantissa register 111 stores the output value of the mantissa normalization shift register 109 and outputs the result value of the fraction. The exponent correction circuit 108 corrects and outputs by increasing or subtracting the exponent value by the counted value of the leading zero counter 107 according to whether an overflow is detected at the anticipating overflow and rounding-off circuit 105. The exponent register 110 stores the exponent value corrected at the exponent correction circuit 108 and outputs the final result of the exponent.

The floating point arithmetic unit of FIG. 5 compares the exponents A and B of the two operands, which are stored in the memory 100 at the exponent comparator 101 which is the data alignment circuit, applies the fraction of the smaller exponent to the first mantissa selection memory 102, applies the fraction of the larger exponent to the second mantissa selection memory 103, and applies the greater exponent to the exponent correction circuit 108.

The first mantissa selection memory 102 selects a fraction of the smaller exponent between the two fractions A and B inputted from the memory 100, shifts the selected number to the right by a difference of the two exponents inputted from the exponent comparator 101, inputs the value $S_0$ to $S_{31}$ into the floating point adder circuit 104, and generates the Guard bit G judging data of the rounding-off, the Round bit R, and the Sticky bit Sy.

The second mantissa selection memory 103 inputs the fraction of the larger exponent among the two fractions A and B inputted from the memory 100 into the floating point adder circuit 104.

At this time, the anticipating overflow and rounding-off circuit 105 determines the rounding-off and its location according to the operation result of the floating point adder circuit 104 and applies them to the floating point adder circuit 104.

The floating point adder circuit 104 adds or subtracts the fraction value $S_0$–$S_{31}$ of the smaller fraction inputted from the first mantissa selection memory 102 and the fraction value $L_0$–$L_{31}$ of the larger exponent inputted from the second mantissa selection memory 103, and also adds or subtracts number of rounding-off to/from the anticipating overflow and rounding-off circuit 105 and applies the result value $\Sigma_0$–$\Sigma_{31}$ to the addition register 106 which is a normalization circuit.

The addition register 106 stores numbers from the MSB to Guard bit G among output values of the floating point adder circuit 104 and inputs them into the leading zero counter 107 and the mantissa normalization shift register 109.

At this time, the anticipating overflow and rounding-off circuit 105 selects the overflow from the floating point adder circuit 104, and enables the leading zero counter 107. The leading zero counter 107 counts the value outputted from the addition register 106 and inputs it into the exponent correction circuit 108 and the mantissa normalization shift register 109. The mantissa normalization shift register 109 shifts the value outputted from the addition register 106 by 1 bit according to the leading zero counter 107 and inputs it into the mantissa register 111. The exponent correction circuit 108 increases the value of the larger exponent inputted from the exponent comparator 101 by 1 and inputs it into the exponent register 110.

If an overflow did not occur from the floating point adder circuit 104, the leading zero counter 107 counts the number of leading zeros of the addition register 106. The mantissa normalization shift register 109 shifts the outputted value of the floating point adder circuit 104 to the left by the counted number and inputs it into the mantissa register 111. The exponent correction circuit 108 subtracts the value of the larger exponent of the exponent comparator 101 by the counted number and inputs the result value into the exponent register 110.

Accordingly, the value outputted from the exponent register 110 is a result value of the exponent. The value outputted from the mantissa register 111 is a result value of the mantissa.

The rounding-off process in the above floating point arithmetic unit of FIG. 5 uses the signals generated at the floating point adder circuit 104. It does not need an additional incrementor for the rounding-off process, thus reducing the number of needed gates. However, when rounding off with partial signals generated at the floating point adder circuit 104, there may occur a carry propagate delay since the addition/subtraction operation for rounding off is performed using the floating point adder circuit, which performs the addition/subtraction operation, so that there is not much difference in a view of a structure of the conventional floating point addition/subtraction arithmetic unit and the processing delay time. Also it is developed only for the Round to Near/up which is not the IEEE's standard.

U.S. Pat. No. 4,926,370 as shown in FIG. 6 discloses a schematic block diagram of the floating point arithmetic unit of concurrently performing a normalization and rounding-off after an operation of the fraction.

Referring to the figure, there are shown a normalization circuit 200, a control logic circuit 201, a selection circuit 202, a rounding-off circuit 203, and a selective output circuit 204.

The normalization circuit 200 obtains leading zeros through the zero detector 200a from the result value of the fraction inputted from the outside register after the fraction operation and shifts them as much as the leading error in the shifter 200b. The control logic circuit 201 detects the upper 2 bits from a result value of the fraction inputted from the outside register after the fraction operation, generates a normalization selection control signal NS and rounding-off selection control signal RS, and outputs the detected values 1.X or 0.1X. The selection circuit 202 shifts the result value of the fraction inputted from the outside register by 1 bit according to the value detected at the control logic circuit 201. The selective output circuit 204 selects, when the normalization selection control signals NS occur from the control logic circuit 201, the value normalized at the normalization circuit 200, when the rounding-off selection control signal RS occurs, and selects the value rounded-off at the rounding-off circuit and inputs it into the outside register.

According to the above floating point arithmetic unit of FIG. 6, the upper 2 bits are detected after the fraction operation. If the result is 1.X the rounding-off process is performed. If the result is 0.1X, the rounding-off process is performed after 1 bit is shifted to the left. If the result is 0.0X, the normalization of the result value of the fraction directly inputted is performed since it does not need the rounding-off.

As shown in FIG. 6, when the result value of the fraction is inputted from the outside register, the zero detector 200a of the normalization circuit 200 obtains leading zeros from the fraction when the upper 2 bits of the fraction are 0.0X, shifts the obtained leading zeros to the shifter 200b, and inputs the normalized value to the selection output circuit 204.

The control logic circuit detects the upper 2 bits of the fraction inputted from the outside register after the fraction operation, if its type is 0.0X, inputs the normalization selection control signal NS into the selection output circuit 204 and permits the normalization circuit 200 to select normalized value, if the upper 2 bits are 0.1X or 1.X, generates the rounding-off selection control signal RS and inputs the control signal RS into the selection output circuit 204, and inputs 0.1X and 1.X into the selection circuit 202.

The selection circuit 202, when 0.1X is inputted from the control logic circuit 201, shifts the result value of the fraction inputted from the outside register by 1 bit and inputs it into the rounding-off circuit 203. When 1.X is inputted, the selection circuit 202 inputs the result value of the fraction into the rounding-off circuit 203 without shifting.

Accordingly, the rounding-off circuit 203 rounds off the result value of the operation of the fraction inputted from the selection circuit 202 and inputs it into the selection output circuit 204. The selection output circuit 204 selects the value rounded off at the rounding-off circuit 203 according to the rounding-off selection control signal RS occurring only in case the upper two bits checked at the control logic circuit 201 are 0.1X or 1.X, and selects the value from the normalization circuit according to the selection control signal NS occurring in case the upper two bits are 0.0X. The selection circuit 204 outputs the selection to the outside register.

However, even in the above floating point arithmetic unit of FIG. 6, there may occur an overflow due to the rounding-off process and thus causing re-normalization. In addition, it can cause problems of processing without considering the types of 1X.X bits which may come from the fraction operation.

SUMMARY OF THE INVENTION

Accordingly, it is an object of the present invention to provide a floating point addition/subtraction arithmetic unit capable of executing an addition/subtraction operation in parallel and rounding-off out of the four operation steps which are an exponent alignment, an addition/subtraction operation, normalization and rounding-off.

It is a further object of the present invention to provide a method and apparatus of improving the efficiency of the arithmetic unit in point of operation speed and the occupying area of the arithmetic unit by removing an adder used during a rounding-off and a gate adapted therein.

It is a still further object of the present invention to provide a method and apparatus of fundamentally removing a re-normalization which is to take place in the common floating point addition/subtraction operation by performing the floating addition/subtraction and rounding-off in parallel.

To achieve the objects, it includes a method of aligning the fraction portions of the first and second floating point operands by a difference value of their exponents obtained by comparing the respective exponents of the first and second operands; performing an addition/subtraction operation upon the aligned fractions and selectively outputting a rounded-off result value-in response to the four modes of rounding-off namely, "Round to Nearest," "Round to Zero" Round to Positive Infinity" and "Round to Negative Infinity" designated by IEEE Standard No. 754-1985 according to a result value of the addition and subtraction operation; and performing a normalization for obtaining a final output value in accordance with a normalization of the selectively outputted of the rounded-off value.

To achieve the objects, it includes an apparatus of data alignment circuit for aligning the fraction portions of the first and second operands by a difference of their exponents by comparing the respective exponents of the first and second operands; addition/subtraction and rounding-off for selectively outputting the result value of an addition/subtraction performed upon the first and second operands with a fraction unit of the result aligned at the data alignment circuit and for rounding-off the result value in parallel in response to the result value of the addition/subtraction operation; and a normalization for normalizing the rounded off operation result value selected at the addition/subtraction and rounding-off to output a final result.

BRIEF DESCRIPTION OF THE DRAWINGS

FIG. 1 is a view showing a single precision which is the IEEE's standard in an expression of the floating point number.

FIG. 2 is a view showing double precision which is the IEEE's standard in an expression of the floating point number.

FIG. 3 is a view showing Guard bit, Round bit and Sticky bit when the normalized operand is a single precision type and shifted to the right by 8 bits.

FIG. 10 is a table showing the rounding-off increment bit and the rounding-off control value in case of Round to Nearest according to the present invention.

FIG. 11 is a table showing the rounding-off increment bit and the rounding-off control value in case of Round to Zero according to the present invention.

FIG. 12 consisting of FIGS. 12A and 12B is a table showing the rounding-off increment bit and the rounding-off control value in case of Round to Positive Infinity according to the present invention, wherein;

FIG. 12A is the sign bit while the subtraction operation is zero; and

FIG. 12B is the sign bit while the subtraction operation is 1.

DESCRIPTION OF THE PREFERRED EMBODIMENTS

Figure 4:
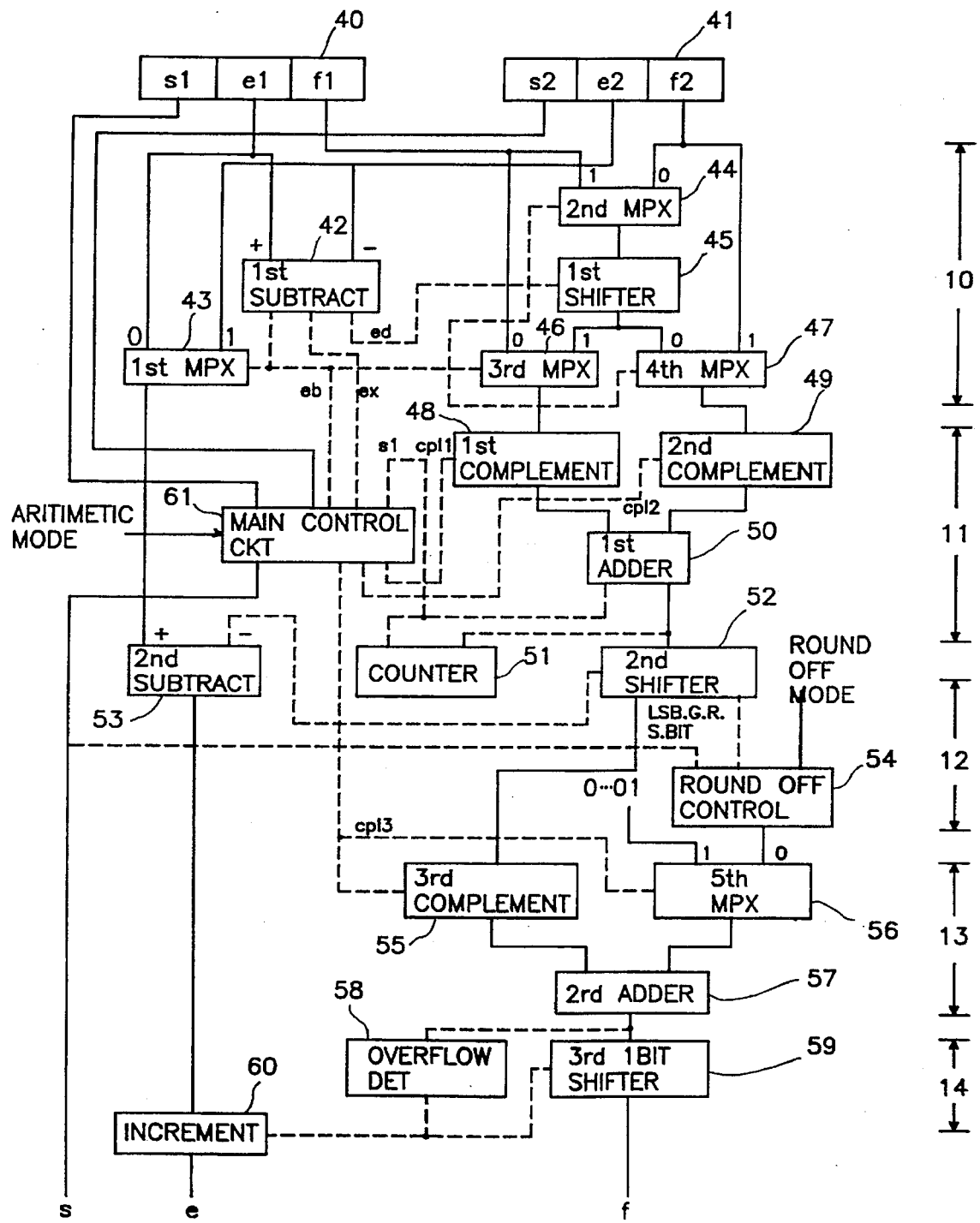
FIG. 4 is a block diagram showing a structure of the conventional floating point arithmetic unit.
Figure 5:
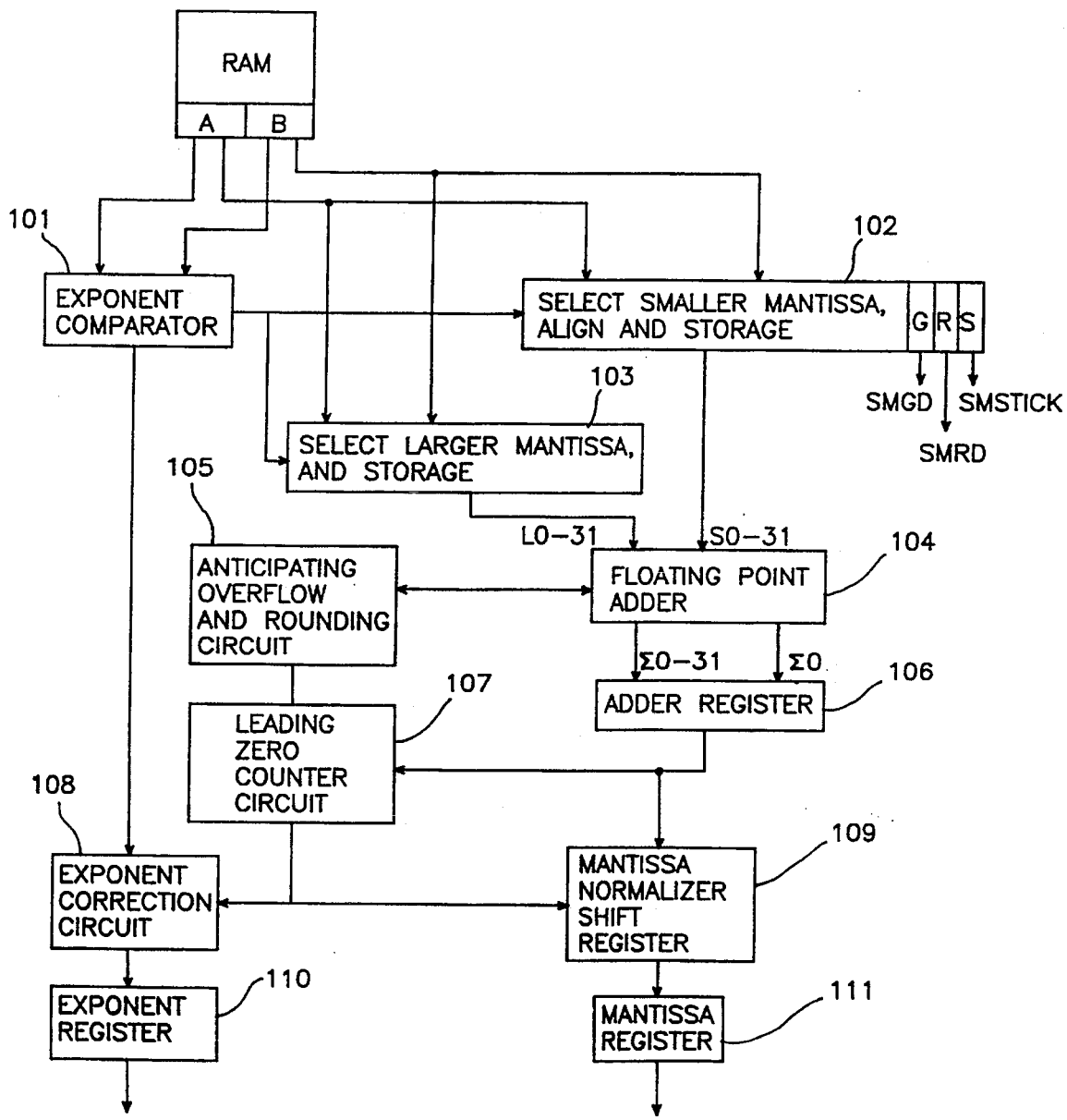
FIG. 5 is a block diagram showing a structure of the floating point arithmetic unit in an anticipation of the conventional rounding-off process.
Figure 6:
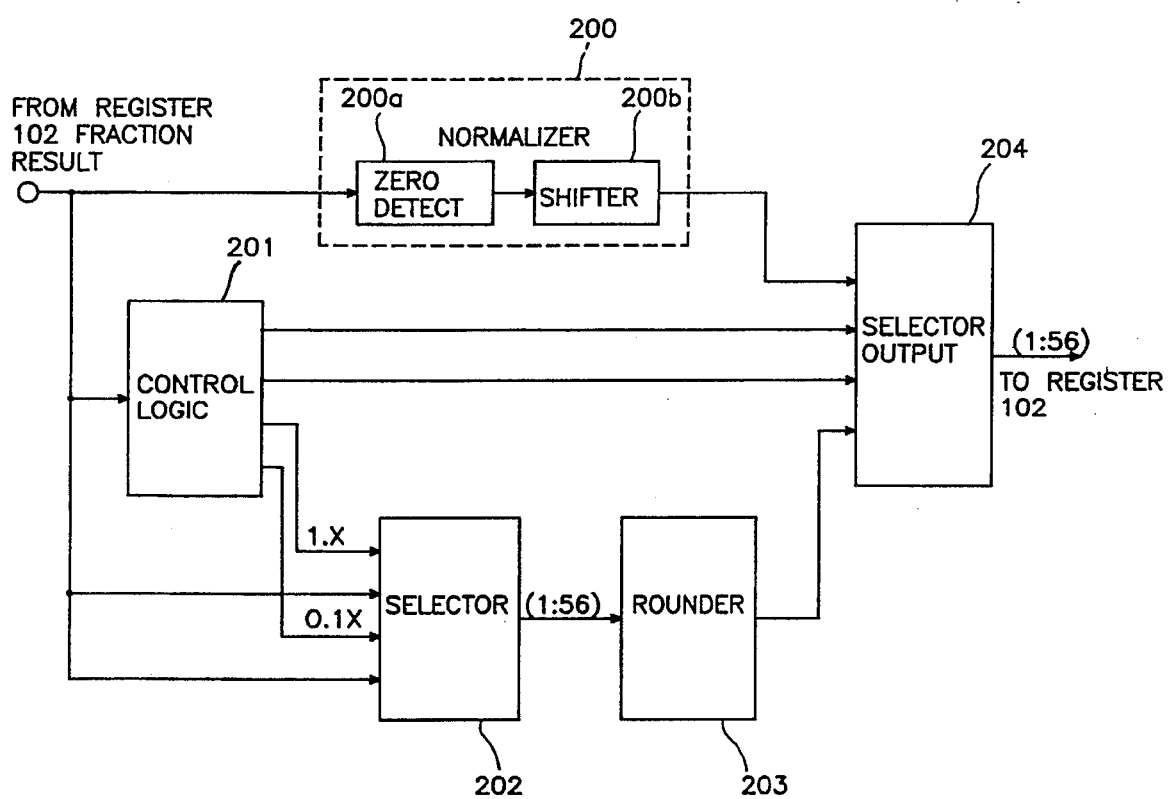
FIG. 6 is a block diagram showing a structure of concurrently processing the normalization and rounding-off of the conventional floating point arithmetic unit.
Figure 7:
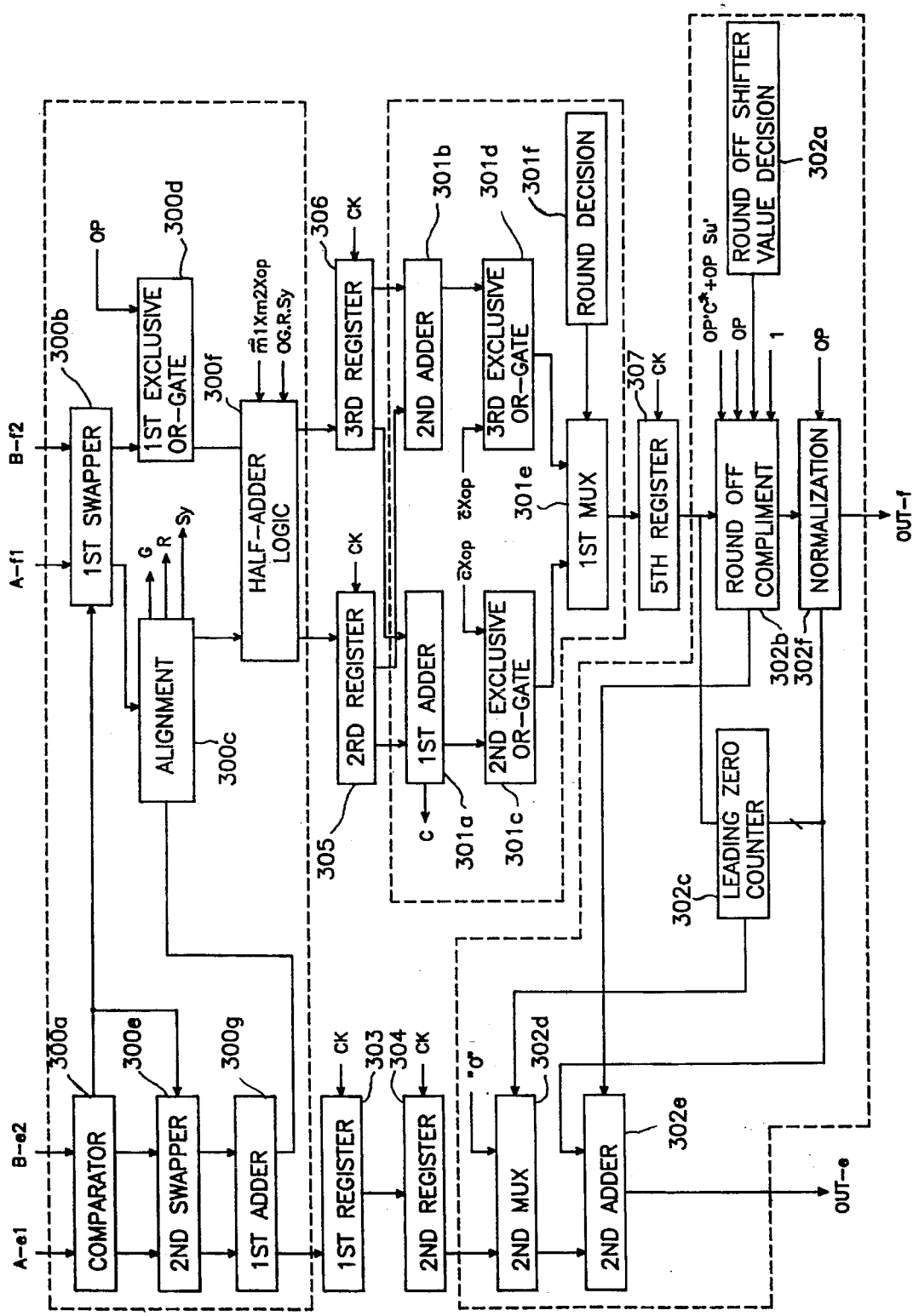
FIG. 7 is a structural view of the floating point addition/subtraction arithmetic unit according to the present invention.

FIG. 7 shows a floating point addition/subtraction arithmetic unit according to the present invention. There are shown a data alignment circuit 300, an addition/subtraction operation and rounding-off circuit 301, and a normalization circuit 302.

In an arrangement described above, the data alignment circuit 300 selects and outputs the larger exponent by comparing exponents A_e and B_of first and second operands inputted, and aligns fractions A_f and B_f of the first and second operands A and B by a difference of compared exponents. The addition/substraction operation and the rounding-off circuit 301 adds and subtracts the fraction of the first and second operands aligned at the data alignment circuit 300, and selectively outputs the rounded-off value according to the result value after an addition/subtraction operation. The normalization circuit 302 normalizes a rounding-off value of the addition/subtraction operation obtained from the addition/subtraction operation and rounding-off circuit 301, and obtains a final operation value of the fraction and exponent.

The data alignment circuit 300 further includes an exponent comparator 300a, a first swapper 300b, a second swapper 300e, a first exponent adder 300g, a fraction alignment circuit 300c, a first exclusive OR-gate 300d, and a half-adder logic circuit 300f.

In an arrangement described above, the exponent comparator 300a compares exponents A_e and B_e of the first and second operands A and B, outputs the result signal(e.g. "Swap signal") and then outputs the exponents A_e and B_e. The first swapper 300b output one of the fractions A_f and B_f of the first and second operands A and B according to the result (e.g. "Swap signal") compared at the exponent comparator 300a having the smaller exponent. The second swapper 300e aligns the two exponents A_e and B_e according to the result signal (e.g. "Swap signal") compared at the exponent comparator 300a, to align the smaller exponent with the larger exponent. The first exponent adder 300g selects the larger exponent between the two exponents inputted at the second swapper 300e and outputs it and also outputs the difference value between the two exponents. The alignment circuit 300c shifts the fraction having the smaller exponent inputted from the first swapper 300b to the right by the difference value inputted from the adder 300g and generates Guard bit G, Round bit R and Sticky bit Sy. The first exclusive OR-gate 300d inverts the fraction having the larger exponent inputted from the first swapper 300b according to the control signal Op of the operands, outputs it or directly outputs the inputted value. The half-adder logic circuit 300f passes a result value obtained from the first exclusive OR-gate 300d and a result value of the alignment circuit 300c or acts as a half-adder according to the rounding-off mode m1 and m2 inputted from the outside and to the type of operation.

The addition/subtraction operation and rounding-off circuit 301 further includes a first fraction adder 301a, a second fraction adder 301b, a second and third exclusive OR-gates 301c and 301d, a first multiplexer 301e, and a rounding-off decision circuit 301f.

In an arrangement described above, the first fraction adder 301a outputs the added two output value of the half-adder logic circuit 300f and the carry C thereof. The second fraction adder 301b outputs the value added by 1 to the added two output values from the half-adder logic circuit 300f. The second and third exclusive OR-gates 301c and 301d invert or pass the output result signal of the first and second fraction adders 301a and 301b according to the signal obtained by logically ANDing an inverted value of the carry C obtained from the first fraction adder 301a and the control signal Op of the operand. The first multiplexer 301e selects and outputs the rounded result value outputted from the second and third exclusive OR-gate 301c and 301d. The rounding-off decision circuit 301f generates a rounding-off control signal in order for select a value rounded off at the first multiplexer 301e.

The normalization circuit 302 further includes a rounding-off shift value decision circuit 302a, a rounding-off supplement circuit 302b, a leading zero counter 302c, a fraction normalization circuit 302f, a second multiplexer 302d, and a second exponent adder 302e.

When a bit of the MSB of the result generated after the fraction operation during a subtraction operation is zero, 1 bit is shifted to the left, the rounding-off shift value decision circuit 302a generates values S0* to be shifted to the LSB according to the rounding-off mode and outputs the generated values selectively. The rounding-off supplement circuit 302b, which is a bi-directional shifter, supplements the rounding-off of the result value of the rounded-off fraction inputted from the first multiplexer 301e by the rounding-off decision circuit 301f to the LSB generated at the rounding-off shift value decision circuit 302a according to the shift value S0* and an enabling signal C+OP+145B. The leading zeros counter 302c counts the leading zeroes from the result value of the fraction inputted from the first multiplexer 301e by the rounding-off decision circuit 301f, and outputs the counted value. The fraction normalization circuit 302f, in the subtraction operation, normalizes the result value of the fraction supplemented from the rounding-off supplement circuit 302b according to the value counted from the leading zero counter 302c, and outputs the fraction of the final addition/subtraction operation. The second multiplexer 302d selects the one value, between the larger exponent output from the first exponent adder 300g of the data alignment circuit 300 and zero according to the value counted at the leading zero counter 302c. The second exponent adder 302e obtains a difference between a result value selected at the second multiplexer 302d and a result value counted at the leading zero counter 302c, and obtains the exponent of the final addition/subtraction operation.

Figure 8:
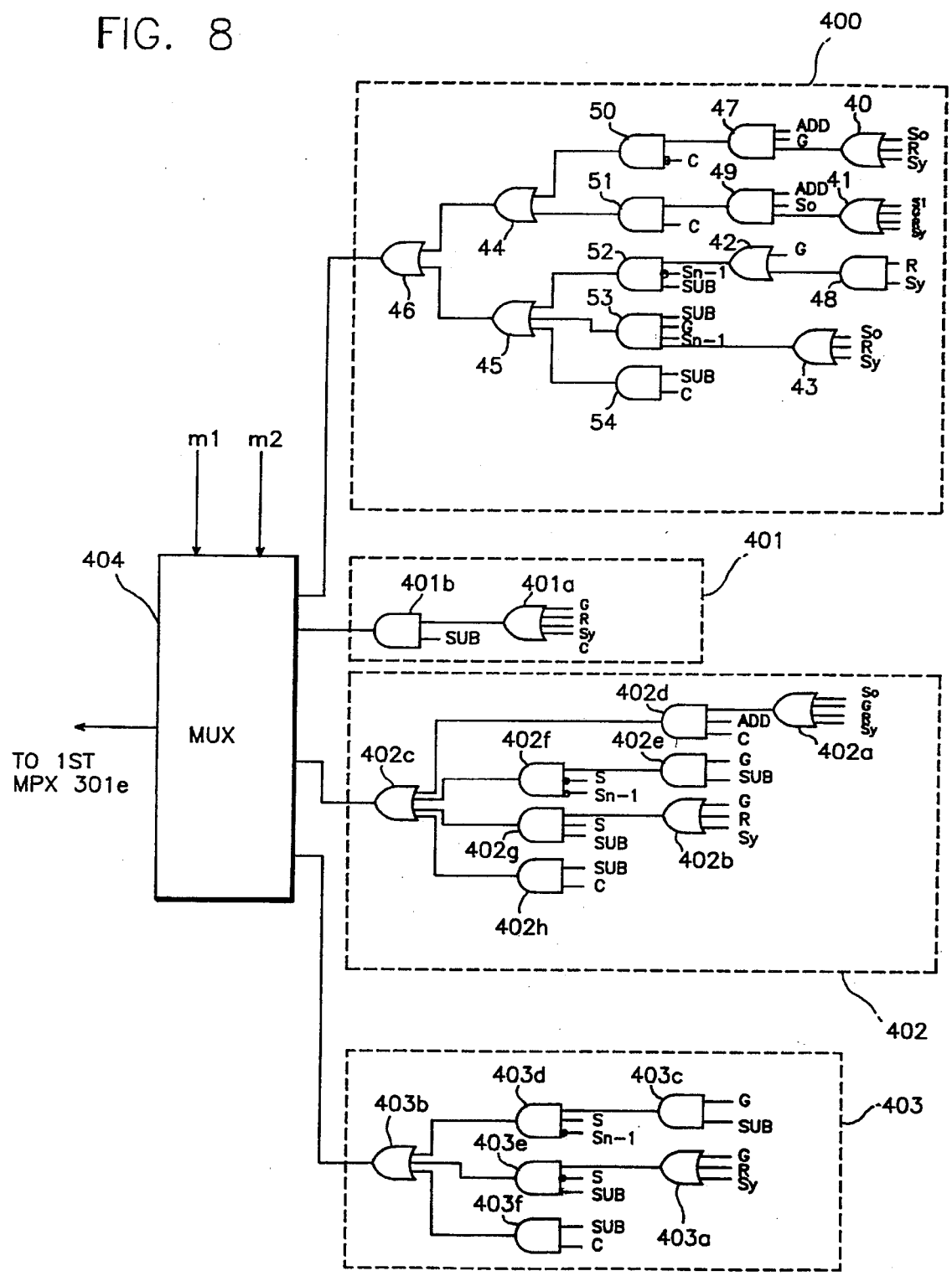
FIG. 8 is a circuit showing the rounding-off decision circuit of FIG. 7.

The rounding-off decision circuit 301f of the addition/subtraction and rounding-off circuit 301, as shown in FIG. 8, further includes a first rounding-off generation circuit 400, a second rounding-off generation circuit 401, a third rounding-off generation circuit 402, a fourth rounding-off generation circuit 403, and a rounding-off mode selection circuit 404.

In an arrangement described above, the first rounding-off generation circuit 400 generates Round to Nearest control values based on logic operations using Guard bit G, Round bit R and Sticky bit Sy, which are generated at the fraction alignment circuit 300c; the MSB $S_{n-1}$ and LSB S0 of a result generated in 1's complement system; first bit $S_1$ of a result generated in 1's complement system; a carry C generated at the first fraction adder 301a; and addition/subtraction operation values Add and Sub inputted from the controller. The second rounding-off generation circuit 401 generates a Round to Zero control value based on logic operations using Guard bit G, Round bit R and Sticky bit Sy, which are generated at the fraction alignment circuit 300c; a carry C generated at a first fraction adder 301a; and a subtraction operation value Sub inputted from the controller. The third rounding-off generation circuit 402 generates a Round to Positive infinity control value based on logical operations using Guard bit G, Round bit R and Sticky bit Sy, which are generated at the fraction alignment circuit 300c; addition/subtraction operation signals Add and Sub inputted from the controller; a carry C inputted from the first fraction adder 301a; the MSB $S_{n-1}$ and LSB S0 of a result generated in 1's complement system; and a sign bit S of the fraction against a result of the operation. The fourth rounding-off generation circuit 403 generates a Round to Negative infinity control value based on logical operations using Guard bit G, Round bit R and Sticky bit Sy, which are generated at the fraction alignment circuit 300c; subtraction operation value Sub inputted from the controller; a carry C inputted from the first fraction adder 301a; the MSB $S_{n-1}$ of a result generated in 1's complement system; and a sign bit S. The rounding-off selection circuit 404 selects Round to Nearest control value, Round to Zero value, Round to Positive infinity control value and Round to Negative infinity control value according to the rounding-off mode m1 and m2 to be inputted, and inputs them into the first multiplexer 301e.

At this time, the first rounding-off generation circuit 400 consists of a first to seventh OR-gates 440 to 446 and a first to eighth AND-gates 447 to 454 so that a rounding-off control value inputted into the first multiplexer 301e should be "Add*($\overline{C}$*G*(S0+R+Sy)+C*S0*($S_1$+G+R+Sy))+Sub*($\overline{S_{n-1}}$*((R*Sy)+G)+$S_{n-1}$*((S0*G)+(G*Sy)+(G*R))+C)."

In addition, the second rounding-off generation circuit 401 consists of an eighth OR-gate and ninth AND-gate 401b so that a rounding-off control value inputted into the first multiplexer 301e should be "Sub *(G+R+Sy+C)."

In addition, the third rounding-off, generation circuit 402 consists of a ninth to eleventh OR-gates 402a to 402c and a tenth to fourteenth AND-gates 402d to 402h so that a rounding-off control value inputted into the first multiplexer 301e should be "Add *C*(S0+G+R+Sy)+Sub*($\overline{S}$*($\overline{S_{n-1}}$ *G)+S*(G+R+Sy)+C)."

In addition, the fourth rounding-off control circuit 403 consists of a twelfth and thirteenth OR-gates 403a and 403b and a fifteenth to eighteenth AND-gates 403c to 403f, so that a rounding-off control value inputted into the first multiplexer 301e should be "Sub*(S*($\overline{S_{n-1}}$*G)+ $\overline{S}$*(G+R+Sy)+C)."

Figure 9:
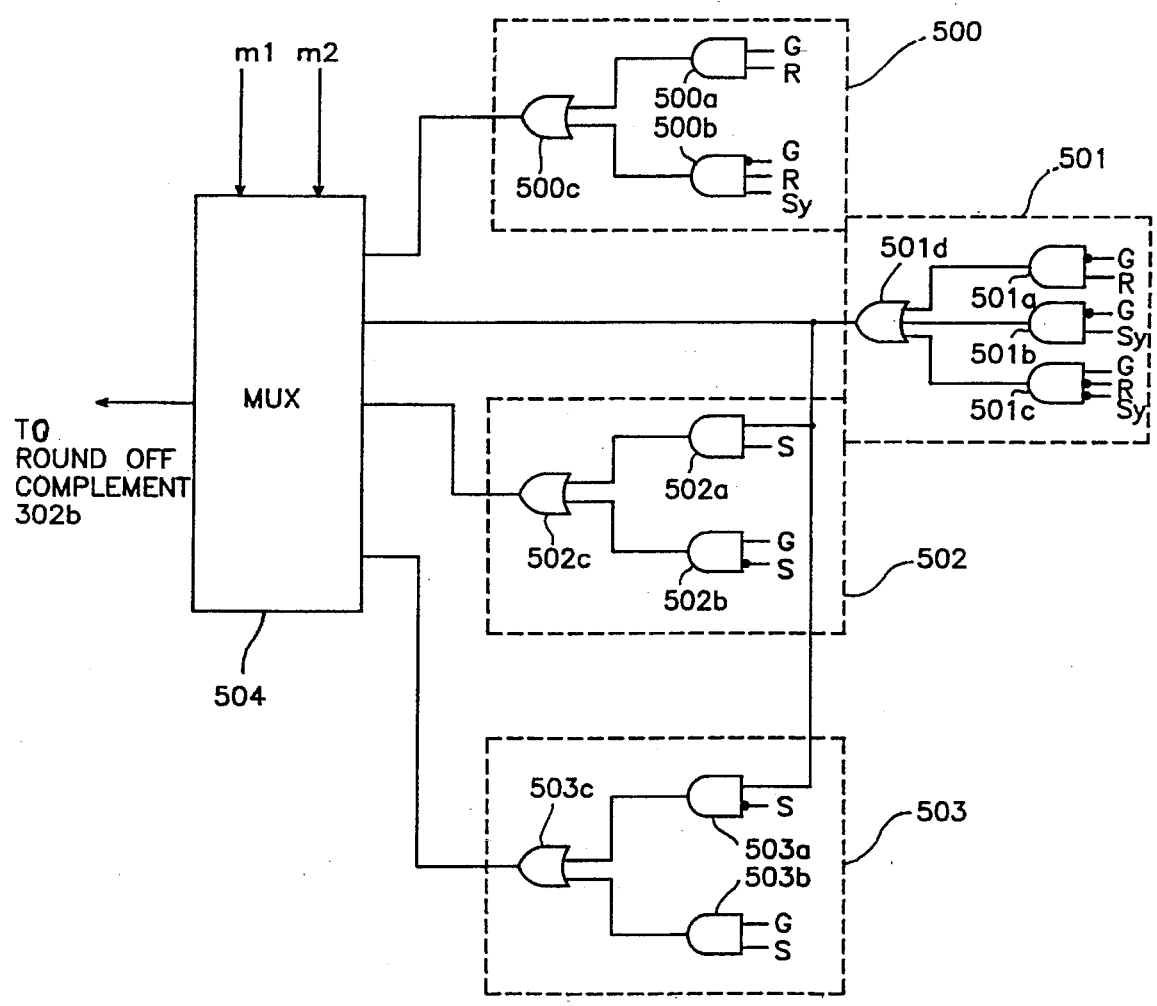
FIG. 9 is a detailed circuit showing the Round-shift value decision circuit of FIG. 7.

The rounding-off shift value decision circuit 302a of the normalization circuit 302, as shown in FIG. 9, includes a first shift value generation circuit 500, a second shift value generation circuit 501, a third shift value generation circuit 502, and a fourth shift value generation circuit 503.

In an arrangement described above, the first shift value generation circuit 500 consists of the fourteenth OR-gate 500c and the nineteenth and twentieth AND-gates 500a and 500b which generate a rounding-off shift value S* of Round to Zero based on a logical operation using Guard bit G, Round bit R and Sticky bit Sy, which are generated at the fraction alignment circuit 300c by using "(R*G)+(R*Sy* $\overline{G}$)." The second shift value generation circuit 501 consists of the fifteenth OR-gate 501d and twenty first to twenty third AND-gates which generate a rounding off shift value S* of Round to Nearest based on a logical operation using Guard bit G, Round bit R and Sticky bit Sy which are generated at the fraction alignment circuit 300c by using "($\overline{G}$ *R)+( $\overline{G}$*Sy)+(G*$\overline{R}$*$\overline{Sy}$)." The third shift value generation circuit 502 consists of the twenty fourth and twenty fifth AND-gates 502a and 502b by logically making Guard bit G generated at the fraction alignment circuit 300c, the sign bit S of the fraction against a result of the operation and the shift value S* generated at the second shift value generation circuit 501 by using "($\overline{S}$*G)+S*(($\overline{G}$*R)+($\overline{G}$ *Sy)+(G*$\overline{R}$* $\overline{Sy}$)." The fourth shift value generation circuit 503 consists of the seventeenth OR-gate 503c and twenty sixth and twenty seventh AND-gates 503a and 503b based on logical operation using Guard bit G generated at the fraction alignment circuit 300c, sign bit S of the fraction against a result of the operation, and shift value S* generated at the second shift value generation circuit 501 by using "(S*G)+ ($\overline{S}$*(( $\overline{G}$*R)+($\overline{G}$*Sy)+(G*$\overline{R}$*$\overline{Sy}$)."

Numerals 303 to 307 in FIG. 7 indicate a first to fifth registers for a pipeline, which is controlled by a clock CK.

Referring to FIGS. 7 to 12, the operation of the present invention will be described.

Firstly, when the two operands A and B are inputted into the comparator 300a and the first swapper 300b of the data alignment circuit 300, the exponent comparator 300a compares the inputted two exponents A_e and B_e of the two operands A and B. If the exponent A_e is larger than the exponent B_e, the exponent comparator 300a applies a signal to the first and second swappers 300b and 300e to swap, and at the same time, applies the exponents A_e and B_e to the second swapper 300e.

The second swapper 300e applies the two exponents A_e and B_e to the first exponent adder 300g, so that number of the exponent A_e should be larger than that of exponent B_e according to the swapper signal generated at the exponent comparator 300a.

The first swapper 300b aligns the fraction A_f and B_f of the two operands A and B according to the compared value of the two exponents inputted from the exponent comparator 300a. Then the first swapper 300b inputs the fraction of the larger exponent into the first exclusive OR-gate 300d, and the fraction of the smaller exponent into the fraction alignment circuit 300c.

For an amount of the fraction to be shifted, the first exponent adder 300g obtains a difference of the two exponents A_e and B_e inputted from the second swapper 300e, inputs the difference value into the fraction alignment circuit 300c, and applies the larger number between the two exponents A_e and B_e to the first register 303, at this time, as described in the double precision type, the difference between the two exponents is 6 bits since the maximum bit number of the fraction to be expressed is 53.

Accordingly, the difference value of the two exponents obtained at the first exponent adder 300g is applied to the fraction alignment circuit 300c in 6 bits.

The fraction alignment circuit 300c shifts the fraction of the smaller exponent inputted from the first swapper 300b to the right by the difference value of the two exponents inputted from the first exponent adder 300g, and transfers the result value to the half-adder logic circuit 300f.

At this time, Guard bit G, round bit R, Sticky bit Sy, which are needed for rounding-off, are generated and it is provided to the rounding-off decision circuit 301f of the addition/subtraction operation and rounding-off circuit 301 and the rounding-off shift value decision circuit 302a of the normalization circuit 302.

In addition, the first exclusive OR-gate 300d, since the operand control signal Op is zero(positive) in the addition operation, passes the fraction of the larger exponent inputted from the first swapper 300b, and inputs it into the half-adder logic circuit 300f. In the subtraction operation, since the operand control signal Op is 1 (negative), it inverts the fraction of the larger exponent inputted from the first swapper 300b and inputs it into the half-adder logic circuit 300f.

The half-adder logic circuit 300f, when the operation is addition and the rounding-off mode m1 and m2 are to positive infinity, acts as a half-adder and adds the fraction of the smaller exponent inputted from the fraction alignment circuit 300c and the fraction of the larger exponent inputted from the first exclusive OR-gate 300d, and inputs Guard bit G, or Round bit R, Sticky bit Sy of the fraction alignment circuit 300c into the LSB.

It is possible to perform the rounding-off methods of Round to Nearest and Round to Negative Infinity without the half-adder logic circuit, but in case of Round to Positive infinity, if an overflow occurs after the addition at the fraction, there may occur improper control signals at the first multiplexer 301e using the first and second fraction adder 301a and 301b and the second and third exclusive OR-gates 301c and 301d.

Like Round to Nearest, when a carry C takes place at the first fraction adder 301a during the addition operation, the LSB so of the result generated in 1's complement should be 1 for the increment for rounding-off. When, however, Round to Positive Infinity is performed, the carry C occurs during the addition operation, and the LSB S0 of a result generated in 1's complement is zero, there may occur an increment during the rounding-off process due to Guard bit G, Round bit R and Sticky bit Sy which are generated at the fraction alignment circuit 300c, so that 1 needs to be added to the $S_1$ of a result generated in 1's complement or 2 need to be added to the LSB S0 of a result generated in 1's complement.

For resolving the problems, there are provided the half-adder logic circuit 300f ahead of the fraction operation during the addition operation in Round to Positive Infinity.

The half-adder logic circuit 300f of the data alignment circuit 300 passes the fraction of the smaller exponent inputted from the fraction alignment circuit 300c and the fraction inputted from the first exclusive OR-gate 300d into the third and fourth registers 305 and 306, when the enabling signal logically ORed the rounding-off modes m1 and m2, and the operand control signal Op are of low signal L, that is, if not entered into m1=0, m2=1, Op=0, by directly passing the fraction of smaller exponent which is inputted from the fraction alignment 300c and the fraction of greater exponent which is inputted from the first exclusive OR-gate 300d. If the enabling signal is high signal H, the half-adder logic circuit 300f operates as a half-adder and inputs Guard bit G Round bit R or Sticky bit Sy into the LSB of the fraction A_f of the larger exponent between the two fractions A_f and B_f, which are the result of the half-adder, and of which fractions A_f and B_f passed the half-adder logic are inputted into the third and fourth registers.

The third and fourth registers 305 and 306 synchronize the result value outputted from the half-adder logic circuit 300f of the data alignment circuit 300 against the inputting clock CLK and inputs into the first and second fraction adder 301a and 301b of the addition/subtraction operation and rounding-off circuit 301.

Before describing a method of performing the fraction addition/subtraction in parallel and rounding-off in the addition/subtraction rounding-off circuit 301, it will be better to describe a structure of the addition/subtraction arithmetic unit according to the present invention and its characteristics.

In the floating point addition/subtraction arithmetic unit, the characteristic of the addition/subtraction operation in the fraction is that the fraction of the number of the floating point represents the absolute value according to the IEEE's standard. Therefore, in case of the addition operation, it needs to add two fractions with each other like the usual addition operation.

But, in case of subtraction, if a result value is negative after subtraction, the result value should be converted into the absolute value. In this case the converter and the incrementor are needed so as to make the negative value the absolute value since the expression of the number is in 2's complement, however the incrementor works as an adder in view of its space and speed.

Therefore, there is a problem in that the process thereof takes a long time since the incrementor is connected with the adder for the operation.

To solve these problems, when the fractions of the two operands A and B inputted into the addition/subtraction arithmetic unit are f1 and f2, respectively, and the result value during the subtraction operation is SM, the positive number is selected between two result values by obtaining SM=f1−f2 and SM=f2−f1.

At this time, 1's and 2's complement systems are needed to be used, to be described in the description of the addition/ subtraction operation and rounding-off circuit 301 shown in FIG. 7.

Where, if f1>f2, SM=f1−f2=f1+$\overline{f2}$+1.

Where, if not f1>f2, SM=f2−f1=−(f1−f2), at this time, the second and third adders 301c and 301d of the addition/ subtraction operation and rounding-off circuit 301 operate as an inventors.

$$SM = -(f1 + \overline{f2} + 1) = -(f1 + \overline{f2}) - 1 \qquad \text{Formula 1}$$
$$= \overline{(f1 + \overline{f2})} + 1 - 1$$
$$= \overline{(f1 + \overline{f2})} = \overline{(f1 + \overline{f2} + 0)}$$

If the condition of the fraction of the operands A and B is f1>f2, a carry C occurs at f1+$\overline{f2}$. If the condition of the fraction of the operands A and B is f1≧f2, a carry C does not occur at f1+$\overline{f2}$.

Therefore, if the carry C occurs after the operation of f1+$\overline{f2}$ then f1>f2, and the f1+$\overline{f2}$+1 is selected. If carry C does not occur, it is f1<f2, then, the inverted value is selected at f1+$\overline{f2}$.

In addition, the formula described above can be implemented in the addition/subtraction operation and rounding-off circuit 301 cooperating with 1's and 2's complement systems according to the present invention as shown in FIG. 7.

The structure according to the present invention computes "f1+$\overline{f2}$" and "f1+$\overline{f2}$+1" in parallel, which is needed in the subtraction operation, and then requires time for just one addition operation so that additional delay does not happen.

The following are the characteristics of the addition/ subtraction operation.

In case of the addition, when the carry C is zero, the shift for normalization is not needed, and when the carry C is 1 the shift is performed to the right by 1 bit.

When the shift does not occur, Guard bit G, Round bit R and Sticky bit Sy directly becomes the judgement data of the rounding-off, on the contrary, when the shift occurs, the LSB is shifted to Guard bit G and Guard bit to Round bit, and the Round bit is logically ORed to Sticky bit Sy, respectively, so that the result becomes the judgement data of the rounding-off.

In case of subtraction, it has a more complicated process than that of addition.

In the process of exponent alignment, if more than two bits are shifted, a 1 bit Shift to the left occurs or no shift occurs.

In the following example, a 1 shift to the left is needed, in case of subtracting the value shifted by 2 bits of 1.11 . . . 1 of the possible largest value in the fraction from the 1.00 . . . 0 of the possible smallest value in the fraction.

Example 1:
```
  1.0000 . 00 00
 −0.0111 . . . 1111 11
  0.1000 . . . 0000 01
```

In this case, when the shift for normalization does not occur the rounding-off is performed with guard bit G, Round bit R and Sticky bit Sy. When the shift for normalization occurs, by shifting 1 bit to the left, Guard bit G is shifted to the LSB, Round bit R is shifted to Guard bit, then Sticky bit Sy is shifted to Round bit R, respectively.

When an alignment shift of less than 1 bit occurs, there may occur more than 1 bit shifts in the course of the normalization process.

However, in this case, only Guard bit G is generated and Round bit R and then Sticky bit Sy become zero.

At this time, when shifts for normalization do not occur, Guard bit G acts as a rounding-off decision, and when the shifts occur, Guard bit G is inputted into the fraction.

The following shows an example where the second operand is shifted by 1 bit.

Example 2.
```
  1.0000 ... 0000
 -0.1111 .... 1111 1
  0.0000 ... 0000 1
```

In view of subtraction described above, when the value of the MSB is 1 before normalization, the common rounding-off is performed, when the MSB is zero, it is believed that a correct value can be obtained when normalization is performed after shifting the result value of the operation to the left by 1 bit and rounding off the result.

In view of the result, the position to be rounded-off from the result value operated during the addition is decided by the carry C, and during the subtraction, the position is decided by the value of the MSB, wherein shifting is performed for the sake of the normalization.

By adapting the result into the structure of the fraction addition/subtraction, the rounding-off processes can be performed in parallel with the addition/subtraction operation.

In addition, these algorithms eliminate the re-normalization occurring due to the rounding-off after the normalization.

The method of performing the floating point addition/subtraction and rounding-off in parallel by using the three processes according to the present invention will be explained with reference to FIGS. 7 to 12.

By using the characteristic of the addition/subtraction described above, the first fraction adder 301a of the addition/subtraction operation and rounding-off circuit 301 inputs the result value into the second exclusive OR-gate 301c by adding the fraction A_f and B_f inputted from the third and fourth registers 305 and 306. At the same time, the first fraction adder 301a outputs carry C, which is input by the second and third exclusive OR-gates 301c and 301d. The second fraction adder 301b adds the fractions inputted from the third and fourth registers 305 and 306 and the value 1, and then inputs the added value into the third exclusive OR-gate 301d.

Here, the first fraction adder 301a and the second fraction adder 301b are implemented by means of the carry selection adder.

If carry C does not occur at the first fraction adder 301a, that is the carry C is zero, the operand control signal Op is subtraction, and the output result value of the first and second fraction adders 301a and 301b are negative, then the third and fourth exclusive OR-gates 301c and 301d operate as invertors.

In the description of the addition/subtraction, first, in case of the subtraction operation, when the condition of the fraction of the two operands A and B is A_f>B_f, the result of the subtraction is positive and the carry C occurs at the fraction adder 301a. When the process of the second fraction adder 301b is done, the correct value is generated, and when the process of the first fraction adder 301a is done, the value one less than that of the correct value is generated.

In case of A_f≧B_f, the result of the subtraction is negative and the carry C does not occur in the fraction adder 301a. The value through the first fraction adder 301a and second exclusive OR-gate 301c is the correct value. The value through the second fraction adder 301b and the third exclusive OR-gate 301d is one less than that of the correct value.

Therefore, in case of subtraction, the correct value and a value one less than that of the correct value are generated.

In case of the addition operation, since the operand control signal Op is zero, the second and third exclusive OR-gates 301c and 301d do not operate as invertors regardless of the carry C, so that a value one more than that of the correct value through the second fraction adder 301b and the correct value through the first fraction adder 301a are generated and inputted into the first multiplexer 301e.

Therefore, the first multiplexer 301e selects the rounded-off value among values outputted from the second exclusive OR-gate 301c and the third exclusive OR-gate 301d according to the rounding-off control value inputted from the rounding-off decision circuit 301f as shown in FIG. 8, and then inputs them into the fifth register 307.

In detail describing the rounding-off decision circuit 301f with reference of FIG. 8, first, the rounding-off mode selection circuit 404 selects one of among four rounding-off methods designated by the IEEE's standard according to the rounding-off mode m1 and m2, and then inputs the selected value into the first multiplexer 301e, shown in FIG. 7, as a rounding-off control value.

In addition, the rounding-off mode m1 and m2 consists of 2 bits since the number of rounding-off methods designated by the IEEE's standard are 4.

If the rounding-off modes m1 and m2 are 00(zero zero), the Round to Nearest is selected. If the modes m1 and m2 are 10(one zero), the Round to Zero is selected. If the modes m1 and m2 are 01(zero one), the Round to Positive Infinity is selected. If the mode m1 and m2 are 11(one one), the Rounding to Negative Infinity is selected.

The first rounding-off generating circuit 400 as shown in FIG. 8 generates Round to Nearest control value by logically operating on Guard bit G, Round bit R and Sticky bit Sy which are generated at the fraction alignment circuit 300c, the MSB $S_{n-1}$, the LSB $S_0$ and the first bit $S_1$ of the result generated in 1's complement system, the carry C generated at the first fraction adder 301a, and the addition/subtraction values Add/Sub inputted from the controller.

The second rounding-off generating circuit 401 generates the rounding-off control value to zero by logically operating on Guard bit G, Round bit R and Sticky bit Sy which are generated at the data alignment circuit 300c, the carry C generated at the first fraction adder 301a and the subtraction operation signal Sub inputted from the controller.

The third rounding-off generating circuit 402 generates the rounding-of control value to positive infinity by logically operating on Guard bit G, Round bit R and Sticky bit Sy which are generated at the fraction alignment circuit 300c, the addition/subtraction signal Add/Sub inputted from the controller, the carry C inputted from the first fraction adder 301a, the MSB $S_{n-1}$ and the LSB $S_0$, respectively, of the result generated in 1's complement system, and the sign bit S of the fraction against the result of the operation.

The fourth rounding-off generating circuit 403 generates the rounding-off control value to negative infinity by logically operating on Guard bit G, Round bit R and Sticky bit Sy which are generated at the fraction alignment circuit 300c, the subtraction operation signal Sub inputted from the controller, the carry C inputted from the first fraction adder 301a, the MSB $S_{n-1}$ and the LSB $S_0$ of the result generated in 1's complement, and the sign bit S. The rounding-off selection circuit 404 inputs the outputs from the first to fourth rounding-off generating circuits 400–403.

Since the carry C generated at the first fraction adder 301a, the MSB $S_{n-1}$ of the result generated in 1's complement and the sign bit S are the values to be known after the operation, they are processed later. On the contrary, since Guard bit G, Round bit R, Sticky bit Sy, the LSB $S_0$ of the result generated in 1's complement, and the first bit $S_1$ of the result generated in 1's complement are the values known before the completion of the operation, which are variables of the LSB, they should be processed first.

In the first fraction adder 301a, the sign bit S, during addition, becomes zero by adding the two fractions which are positive. During subtraction, if the result of the subtraction operation is negative, the carry C does not occur in the first fraction adder 301a, and when the result of the subtraction operation is positive, the carry C occurs and then they are inputted into the second and third exclusive OR-gates 301c and 301d, respectively.

Therefore, the signal for deciding the sign bit S is decided according to the swap signals which are obtained from the exponent comparator 300a the carry C and the subtraction signal Sub.

Thus, it is decided according to "Sub*$\overline{Swap}$*$\overline{C}$."

The four rounding-off methods implemented by using the methods designated by the IEEE's standard will now be explained in detail with the rounding-off decisions circuit shown in FIG. 8.

First, when the Round to Nearest is performed, the rounding-off position during the addition operation, as described previously, is decided according to the carry C which results from the addition operation.

If carry C is zero, the result of the rounding-off is shown in the following table.

| LSB | Guard bit | Round bit | Sticky bit | Round-off Result |
|---|---|---|---|---|
| 0 | 0 | 0 | 0 | Truncation |
| 0 | 0 | 0 | 1 | Truncation |
| 0 | 0 | 1 | 0 | Truncation |
| 0 | 0 | 1 | 1 | Truncation |
| 0 | 1 | 0 | 0 | Truncation |
| 0 | 1 | 0 | 1 | Increment |
| 0 | 1 | 1 | 0 | Increment |
| 0 | 1 | 1 | 1 | Increment |
| 1 | 0 | 0 | 0 | Truncation |
| 1 | 0 | 0 | 1 | Truncation |
| 1 | 0 | 1 | 0 | Truncation |
| 1 | 0 | 1 | 1 | Truncation |
| 1 | 1 | 0 | 0 | Increment |
| 1 | 1 | 0 | 1 | Increment |
| 1 | 1 | 1 | 0 | Increment |
| 1 | 1 | 1 | 1 | Increment |

If the carry is 1, the result of the rounding-off is shown in the following table.

| S1 | S0 | G | R | Sy | Round Result |
|---|---|---|---|---|---|
| 0 | 0 | 0 | 0 | 0 | Truncation |
| 0 | 0 | 0 | 0 | 1 | Truncation |
| 0 | 0 | 0 | 1 | 0 | Truncation |
| 0 | 0 | 0 | 1 | 1 | Truncation |
| 0 | 0 | 1 | 0 | 0 | Truncation |
| 0 | 0 | 1 | 0 | 1 | Truncation |
| 0 | 0 | 1 | 1 | 0 | Truncation |
| 0 | 0 | 1 | 1 | 1 | Truncation |
| 0 | 1 | 0 | 0 | 0 | Truncation |
| 0 | 1 | 0 | 0 | 1 | Increment |
| 0 | 1 | 0 | 1 | 0 | Increment |
| 0 | 1 | 0 | 1 | 1 | Increment |
| 0 | 1 | 1 | 0 | 0 | Increment |
| 0 | 1 | 1 | 0 | 1 | Increment |
| 0 | 1 | 1 | 1 | 0 | Increment |
| 0 | 1 | 1 | 1 | 1 | Increment |
| 1 | 0 | 0 | 0 | 0 | Truncation |
| 1 | 0 | 0 | 0 | 1 | Truncation |
| 1 | 0 | 0 | 1 | 0 | Truncation |
| 1 | 0 | 0 | 1 | 1 | Truncation |
| 1 | 0 | 1 | 0 | 0 | Truncation |
| 1 | 0 | 1 | 0 | 1 | Truncation |
| 1 | 0 | 1 | 1 | 0 | Truncation |
| 1 | 0 | 1 | 1 | 1 | Truncation |
| 1 | 1 | 0 | 0 | 0 | Increment |
| 1 | 1 | 0 | 0 | 1 | Increment |
| 1 | 1 | 0 | 1 | 0 | Increment |
| 1 | 1 | 0 | 1 | 1 | Increment |
| 1 | 1 | 1 | 0 | 0 | Increment |
| 1 | 1 | 1 | 0 | 1 | Increment |
| 1 | 1 | 1 | 1 | 0 | Increment |
| 1 | 1 | 1 | 1 | 1 | Increment |

Like this, the carry C is 1 after the addition operation, the position of the rounding-off is the first bit $S_1$ of the result generated in 1's complement system.

After the carry C is 1, if the increment occurs in the rounding-off, 1 should be added to the first $S_1$ of the result generated in 1's complement system.

After the carry is 1 the LSB $S_0$ of the result generated in 1's complement should be so that the increment is the first bit of the result generated in 1's complement due to the rounding-off.

Accordingly, adding 1 to the LSB $S_0$ of the result generated in 1's complement has the same effect of adding 1 to $S_1$ since $S_0$ is 1, when considering the rounding-off with the carry C.

Accordingly, the rounding-off to nearest selects the result value inputted into the second exclusive OR-gate 301c if the rounding-off is a truncation among the two output result values of the second exclusive OR-gate 301c and the third exclusive OR-gate 301d, which are inputted into the first multiplexer 301e of the addition/subtraction operation and rounding-off circuit 301 during the rounding-off. If the rounding-off is increment, the rounding-off to nearest selects the result value inputted from the third exclusive OR-gate 301d.

With reference of FIG. 8, the rounding-off decision circuit 301f is explained.

The first rounding-off generating circuit 400 generates the rounding-off control value during addition operation which is input into the first multiplexer 301e through the rounding-off mode selection circuit 404, by the logical operation of the third OR-gates 440, 441, and 444 on Guard bit G, Round bit R and Sticky bit Sy which are generated at the fraction alignment 300c during addition operation, the LSB $S_0$ of the result generated in 1's complement system, the first bit $S_1$ of the result generated in 1's complement, the carry C generated at the first fraction adder 301a, and the addition operation signals Add inputted from the controller.

Therefore, the first rounding-off generating circuit 400 generates Add *($\overline{C}$*G*(S0+R+Sy)+C*S0*($S_1$+G+R+Sy)), and the rounding-off selection circuit 404 inputs this logical value through the seventh OR-gate 446.

More complicated processes appear during a subtraction operation than during the addition operation when Round to Nearest is performed.

As explained previously, the subtraction operation always has a structure of subtracting one operand from the other operand which the exponent alignment performed.

Therefore, when the exponent of the two operands is the same during the subtraction of the fraction, the positive value can be generated, and when the alignment of the exponent due to the difference of the exponent occur, the result of the subtraction is always positive.

When the result of the subtraction operation is positive, the exponent alignment does not occur, so that the increment does not occur in the rounding-off since Guard bit G, Round bit R and Sticky bit Sy are all zero.

Therefore, the control signal inputted into the first multiplexer $301e$ becomes 1, so that the first multiplexer $301e$ selects the value of 2's complement outputted from the third exclusive OR-gate $301d$.

If we assume Guard bit G, Round bit R and Sticky bit Sy which are generated at the exponent alignment, these should be operated on like that of the two operands in case of the subtraction operation. The result of the operation is as follows.

$$(G2, R2, Sy2) = \overline{G, R, Sy + \overline{000}}$$
$$= \overline{G, R, Sy + \overline{111}} = \overline{G1, R1, Sy1}.$$

Thus, $V1 = \text{overflow}((G, R, Sy) + 111)$.

When $(G, R, Sy) + 111$ (i.e., $(G1, R1, Sy1)$) is provided and the overflow occurs, V1 is 1. When V1 is 1, it means to borrow 1 from the result of the subtraction operation of the two fractions.

If the result of the MSB operation is negative and the $S_{n-1}$ of the result generated in 1's complement is 1, the shift for normalization does not occur, so that the rounding-off is performed with Guard bit G2, Round bit R2 and Sticky bit Sy2.

Thus, $V3 = \text{Round to Nearest}(G2, R2, Sy2)$.

The MSB $S_{n-1}$ of the result generated in 1's complement is zero, and the shift of more than 1 bit is performed at the normalization circuit 302.

In case of not considering the rounding-off, the Guard bit G2 is inserted into the LSB of the fraction at the normalization circuit 302.

However, if considering the rounding-off, the rounding-off is performed with Round bit R2, Sticky bit Sy2 after Guard bit G2 is shifted to the right, and the increment or truncation occurs.

At this time, the LSB before the one bit shift and the LSB after the one bit shift, G2, is affected according to the result of increment or truncation in rounding-off.

Thus, the Guard bit G2 is 1 and the value which performed the rounding-off with the Round bit R2 and the Sticky bit Sy2 is an increment, it means that the carry is generated to the LSB before 1 bit shift to the left.

In this case, the value to be shifted to the LSB is zero, not 1, namely the value of Guard bit G2.

If assuming the carry to the LSB before 1 bit shift to the left is V2, S0* of the value to be shifted to the LSB after performing 1 bit shift(described later in the description of the rounding-off shift value decision circuit $302a$) is as follows.

$V2 = G2 * (\text{Round to Nearest}(R2, Sy2, \text{zero}) = \text{increment})$.

$S0^* = G2$ exclusive OR (Round to Nearest(R2, Sy2, zero) = increment)).

Where V1 means to borrow 1 from the result of the operation of the two fractions, V2 and V3 means 1's increment due to the rounding-off. There are no cases where V1 is zero, and V2 or V3 is 1.

Therefore, when the MSB $S_{n-1}$ of the result generated in 1's complement system is 1, the exclusive-ORing value V1 and V2 becomes a control signal of the first multiplexer $301e$.

The shift value S0* to be generated at the rounding-off shift value decision circuit $302a$ of the normalization circuit 302 is inserted-to-the LSB, when 1 bit is shifted to the left at the rounding-off supplement circuit $302b$ of the normalization circuit 302, in case when the MSB $S_{n-1}$ of the result generated in 1's complement system after the selection at the first multiplexer $301e$ is zero.

FIG. 10 shows when the result of the subtraction is negative.

The rounding-off control value during the subtraction operation is inputted into the first multiplexer through the rounding-off selection circuit 404 by the logical operation of the fourth to sixth OR-gates 442, 443 and 444, and the fifth to eighth And-gates 448, 452, 453, and 454 on the Guard bit G, Round bit R and Sticky bit Sy which are generated at the fraction alignment circuit $300c$, S0 of the result generated in 1's complement, $S_{n-1}$ of the result generated in 1's complement system, a carry C generated at the first fraction adder $301a$, and the subtraction operation signal Sub inputted from the controller.

Sub $*(\overline{S_{n-1}}*((R*Sy) + S_{n-1} * (\overline{S0}*G) + (G*Sy) + (G**R)) + C)$ is generated and inputted into the rounding-off mode selection circuit 404 through the seventh OR-gate 446.

Therefore, when Round to Nearest is performed, the rounding-off control value, during the addition/subtraction operation, generated at the first rounding-off generating circuit 400 of the rounding-off decision circuit $301f$ is as follows.

Add $*(\overline{C}*G*(S0 + R + Sy) + C*S0*(S_1 + G + R + Sy)) + \text{Sub}*(\overline{S_{n-1}}*((R*Sy) + G) + S_{n-1}*((S0*G) + (G*Sy) + (G*R)) + C$ is generated and inputted into the first multiplexer $301e$ through the rounding-off mode selection circuit 404.

At the first rounding-off generating circuit 400, after the decision of the carry C and the $S_{n-1}$ generated in 1's complement, which are generated after the addition/subtraction operation of the fraction, the proper rounding-off control value is generated and inputted into the first multiplexer $301e$ with a delay of the three gates: the sixth AND-gate 452, the sixth OR-gate 445 and the seventh OR-gate 446.

Since Guard bit G, Round bit R and Sticky bit Sy are previously known values but $S_{n-1}$ and the C are known after the addition/subtraction operation, the rounding-off control value is applied to the first multiplexer $301e$ after three gates delay.

The first multiplexer $301e$ selects the value rounded-off to nearest between the output values of the second exclusive OR-gate $301c$ and the third exclusive OR-gate $302d$.

At this time, when the MSB $S_{n-1}$ f the result generated in 1's complement is zero, the value $S_0^*$ to be shifted to the right is generated at the first shift value generating circuit 500 of, the rounding-off shift value decision circuit $302a$ provided in the normalization circuit $302'$ shown in FIG. 9 and inputted into the rounding-off complementary circuit $302b$ of the normalization circuit 302 through the rounding-off mode selection circuit 504 according to the rounding-off modes m1 and m2.

When the MSB $S_{n-1}$ is zero, the value S0* to be shifted to the LSB, in case of Rounding to Nearest, is obtained by the logical operation of the nineteenth AND-gates $500a$ and twentieth AND-gates $500b$ of the first shift value generating circuit 500 on the Guard bit G, Round bit R and Sticky bit Sy, and the logical operation of the fourteenth OR-gate $500c$.

According to that, $S0^* = (\overline{R}*G) + (R*Sy*\overline{G})$ is obtained through the rounding-off mode selection circuit 504 and inputted into the rounding-off complementary circuit $302b$.

With reference of FIGS. 7 to 9, Round to Zero method among the four methods designated by the IEEE's standard will be explained by using variables of the rounding-off judgement data.

In case of Round to Zero, the result of the rounding-off during addition operation, as described previously, is a truncation. The rounding-off control value is zero, which is generated at the second rounding-off generating circuit 401 shown in FIG. 8, selected through the rounding-off mode selection circuit 404, and inputted into the first multiplexer 301e shown in FIG. 7.

The result of the rounding-off during subtraction operation is a truncation. The V2 and V3 are zero. The shift value S0*, during Round to Zero, inputted into the rounding-off complementary circuit 302b, generated at the first shift value generating circuit 401 of the rounding-off shift value decision circuit 302a, is $G_2$.

Therefore, in case of Round to Zero, the shift value, the result of the addition/subtraction operation and the rounding-off value is shown in FIG. 11.

The rounding-off control value inputted into the first multiplexer 301e during subtraction is obtained through the logical process of the eighth OR-gate 401a of the second rounding-off generating circuit 401 shown in FIG. 8 on the Guard bit G, Round bit R, Sticky bit Sy, which are generated from the fraction alignment circuit 300c, the carry C inputted from the first fraction adder 301a, and of the ninth AND-gate 401b on the output of the eighth OR-gate 401a and the subtraction operation signal Sub inputted from the controller.

According to that, Sub*(G+R+Sy+C) is logically produced, selected from the rounding-off mode selection circuit 404 of the rounding-off decision circuit 301f, and inputted into the first multiplexer 301e.

Therefore, the rounding-off control value inputted into the first multiplexer 301e during the addition/subtraction operations is Sub*(G+R+Sy+C).

In addition, when the MSB $S_{n-1}$ of the result generated in 1's complement is zero, the value $S_0$* to be shifted to the LSB is generated at the second shift value circuit 501 of the rounding-off shift value decision circuit 302a in the normalization circuit 302 shown in FIG. 9 and inputted into the rounding-off complementary circuit 302b of the normalization circuit 302 through the rounding-off mode selection circuit 504.

Thus, when the MSB $S_{n-1}$ of the result generated in 1's complement is zero, the value of $S_0$* shifted to the LSB, in case of Round to Zero, is obtained by logically operating on the Guard bit, the Round bit R, and the Sticky bit Sy at the twenty first to twenty third AND-gates 501a to 501c of the second shift value generating circuit 501 and the fifteenth OR-gate 501d.

According to that, S0*=$(\overline{G}*R)+(\overline{G}*Sy)+(G*\overline{R}*\overline{Sy})$ is selected through the rounding-off mode selection circuit 504 and inputted into the rounding-off complementary circuit 302b.

With reference of FIGS. 7 to 9, the Round to Positive Infinity method from among the four methods designated by the IEEE's standard will be explained by using variables of the rounding-off judgement data.

In consideration of the carry C, if carry C is zero, the result, of the rounding-off is as follows.

| Sign | Guard bit | Round bit | Sticky bit | Round-off Result |
|---|---|---|---|---|
| 0 | 0 | 0 | 0 | Truncation |
| 0 | 0 | 0 | 1 | Increment |
| 0 | 0 | 1 | 0 | Increment |
| 0 | 0 | 1 | 1 | Increment |
| 0 | 1 | 0 | 0 | Increment |
| 0 | 1 | 0 | 1 | Increment |
| 0 | 1 | 1 | 0 | Increment |
| 0 | 1 | 1 | 1 | Increment |
| 1 | 0 | 0 | 0 | Truncation |
| 1 | 0 | 0 | 1 | Truncation |
| 1 | 0 | 1 | 0 | Truncation |
| 1 | 0 | 1 | 1 | Truncation |
| 1 | 1 | 0 | 0 | Truncation |
| 1 | 1 | 0 | 1 | Truncation |
| 1 | 1 | 1 | 0 | Truncation |
| 1 | 1 | 1 | 1 | Truncation |

If the carry C is 1, the result of the rounding-off is as follows.

| Sign | $S_0$ | G | R | Sy | Round Result |
|---|---|---|---|---|---|
| 0 | 0 | 0 | 0 | 0 | truncation |
| 0 | 0 | 0 | 0 | 1 | increment |
| 0 | 0 | 0 | 1 | 0 | Increment |
| 0 | 0 | 0 | 1 | 1 | increment |
| 0 | 0 | 1 | 0 | 0 | increment |
| 0 | 0 | 1 | 0 | 1 | increment |
| 0 | 0 | 1 | 1 | 0 | increment |
| 0 | 0 | 1 | 1 | 1 | increment |
| 0 | 1 | 0 | 0 | 0 | increment |
| 0 | 1 | 0 | 0 | 1 | increment |
| 0 | 1 | 0 | 1 | 0 | increment |
| 0 | 1 | 0 | 1 | 1 | increment |
| 0 | 1 | 1 | 0 | 0 | increment |
| 0 | 1. | 1 | 0 | 1 | increment |
| 0 | 1 | 1 | 1 | 0 | increment |
| 0 | 1 | 1 | 1 | 1 | increment |
| 1 | 0 | 0 | 0 | 0 | truncation |
| 1 | 0 | 0 | 0 | 1 | truncation |
| 1 | 0 | 0 | 1 | 0 | truncation |
| 1 | 0 | 0 | 1 | 1 | truncation |
| 1 | 0 | 1 | 0 | 0 | truncation |
| 1 | 0 | 1 | 0 | 1 | truncation |
| 1 | 0 | 1 | 1 | 0 | truncation |
| 1 | 0 | 1 | 1 | 1 | truncation |
| 1 | 1 | 0 | 0 | 0 | truncation |
| 1 | 1 | 0 | 0 | 1 | truncation |
| 1 | 1 | 0 | 1 | 0 | truncation |
| 1 | 1 | 0 | 1 | 1 | truncation |
| 1 | 1 | 1 | 0 | 0 | truncation |
| 1 | 1 | 1 | 0 | 1 | truncation |
| 1 | 1 | 1 | 1 | 0 | truncation |
| 1 | 1 | 1 | 1 | 1 | truncation |

Like Round to Nearest, when carry C, during addition operation, occurs, the LSB $S_0$ of the result generated in 1's complement should be 1 for an increment during off. However, when it is Round to Positive Infinity, and the carry C occurs, during the addition operation, the LSB $S_0$ of the result generated in 1's complement is zero, and the increment, during the rounding-off, can be performed due to the Guard bit G, Round bit R and Sticky bit Sy which are generated at the fraction alignment circuit 300c of the data alignment circuit 300, so that 1 is added to the first bit $S_1$ of the result generated in 1's complement system or 2 should be added to the LSB $S_0$ of the result generated in 1's complement system.

In order to do so, in Round to Positive Infinity, the half-adder logic circuit 300f forms part of the data alignment circuit 300.

Therefore, like the contents described above, the fraction inputted from the alignment circuit 300c of the data alignment circuit 300 and the fraction inputted from the first exclusive OR-gate 300d becomes new fractions A1 and B1 through the half-adder logic circuit 300f, at this time the LSB in the fraction A1 becomes zero.

The value of Guard bit G or Round bit R or Sticky bit Sy is inputted into the LSB of the fraction A1 through the half-adder logic circuit 300f.

At this time, when the carry C in the first fraction adder 301a, during the addition operation, is zero, the rounding-off control signal is zero. The rounding-off control system is generated at the third rounding-off generating circuit 402 of the rounding-off decision circuit 301f and inputted into the first multiplexer 301e through the rounding-off mode selection circuit 404, since the value of the Guard bit G or Round bit R or Sticky bit Sy, which is the rounding-off control value are inputted into the half-adder logic circuit 300f.

When the carry C generated at the first fraction adder 301a is 1, the first multiplexer 301e is controlled through the rounding-off selection circuit 404 by the LSB $S_0$, the Guard bit G, the Round bit R, or the Sticky bit Sy through the third rounding-off generating circuit 402 shown in FIG. 8.

Therefore, when the LSB $S_0$ of the result generated in 1's complement system is zero, the carry C occurs due to the result of the addition operation, and the rounding-off is incremented due to the Guard bit, Round bit and Sticky bit, 2 can be added to the result generated in 1's complement.

As shown in FIG. 8, the third rounding-off generating circuit 402 of the rounding-off decision circuit 301f inputs the rounding-off control value, during the addition operation, into the first multiplexer 301e through the eleventh OR-gate 402c and rounding-off mode selection circuit 404. The rounding-off control value is produced by the ninth OR-gate 402a and the tenth AND-gate 402d logically operating on the Guard bit G, Round bit R and Sticky bit Sy which are generated at the fraction alignment circuit 300c, the LSB $S_0$ of the result generated in 1's complement system, the carry C generated at the first fraction adder 301a, and the addition operation signal Add generated at the controller.

In Round to Positive Infinity, Add*(C*(S0+G R+Sy)) is generated, and the first multiplexer 301e is controlled through the eleventh OR-gate 402c and rounding-off selection circuit 404.

In addition, when the sign bit S is zero, the rounding-off in subtraction operation, as described previously, is an increment, and when the sign bit S is 1, it is truncation.

When the sign bit S is zero, the rounding-off control value in Round to Positive Infinity is as shown in FIG. 12A.

When the sign bit S is 1, the rounding-off control value in Round to Positive Infinity is as shown in FIG. 12B.

In case of Round to Positive Infinity of the subtraction operation, the rounding-off control value of the subtraction operation is inputted into the first multiplexer 301e through the eleventh OR-gate 402c and rounding-off mode selection circuit 404, by logically operating on the Guard bit G, Round bit R and Sticky bit Sy, which are generated at the fraction alignment 300c, the sign bit S of the fraction for the result of the operation, the MSB $S_{n-1}$ of the result generated in 1's complement system, the carry C generated at the first fraction adder 301a, and the subtraction operation signal Sub generated the controller. The logic is processed at the eleventh to fourteenth AND-gates 402e to 402h of the third rounding-off generating circuit 402 and the tenth OR-gate 402b.

In Round to Positive Infinity of the subtraction operation, Sub*($\bar{S}$*($\overline{S_{n-1}}$*G)+S*(G+R+Sy)+C) is generated and controls the first multiplexer 301e through the rounding-off mode selection circuit 404 to select the value rounded off among values to be outputted from the second and third exclusive OR-gates 301c and 301d.

Therefore, in Round to Positive Infinity, the rounding-off control value generated at the third rounding-off generating circuit 402 of the rounding-off decision circuit 301f, during addition/subtraction operation, and inputted into the first multiplexer 301e is as follows.

Add*(C*(S0+G+R+Sy)+Sub*($\bar{S}$*($\overline{S_{n-1}}$*G)+S* (G+R+Sy)+C) is generated and controls the first multiplexer 301e through the rounding-off mode selection circuit 404, and enables selection of the result value of the fraction rounded off to positive infinity among the result values of the fraction outputted at the second and third OR-gates 301c and 301d during the addition/subtraction operation.

At this time, when the MSB $S_{n-1}$ of the result generated in 1's complement is zero, the value S0* to be shifted to the LSB is generated at the third shift value generating circuit 502 of the rounding-off shift value decision circuit 302a provided in the normalization circuit 502 shown in FIG. 9 and inputted into the rounding-off supplement circuit 302b of the normalization circuit 302 through the rounding-off mode selection circuit 504 according to the rounding-off modes m1 and m2.

When the MSB $S_{n-1}$ of the result generated in 1's complement is zero, the value of $S_0$* shifted to the LSB, in case of Round to Positive Infinity, is obtained with the Guard bit G, the Sign bit S and the shift control value of the second shift value generating circuit 500, which are logically processed at the twenty fourth and the twenty fifth AND-gates 502a, the sixteenth OR-gate 502c and 502b of the third shift value generating circuit 502.

According to that, ($\bar{S}$*G)+S*($\bar{G}$*R)+(G*Sy)+(G* $\bar{R}$*Sy) is selected through the rounding-off selection circuit 404 and inputted into the rounding-off supplement circuit 302b.

Round to Negative Infinity method among the four methods designated by the IEEE's standard will be explained by using variables of the rounding-off judgement data.

In case of rounding-off to negative infinity of the addition operation, the addition of two positive numbers is positive, and thus it is truncated.

Therefore, the rounding-off control value is zero, which is generated at the fourth rounding-off generating circuit 403, selected through the rounding-off mode selection circuit 404, and inputted into the first multiplexer 301e shown in FIG. 7.

In addition, the rounding-off during the subtraction operation, when the sign bit S is zero, is equal When the sign bit S is 1 in case of Round to Positive Infinity, and when the sign bit S is 1, it is equal when the sign bit is zero in case of Round to Positive Infinity.

Therefore, the rounding-off control value inputted into the first multiplexer 301e is obtained by the logical operation of the fifteenth to eighteenth AND-gates 403c to 403f and the twelfth and thirteenth OR-gates 403a and 403b of the fourth rounding-off generating circuit 403 shown FIG. 8, on the guard bit G, Round bit R and Sticky bit Sy which are generated at the fraction alignment 300c, the sign bit S of the fraction against the result of the operation, the MSB $S_{n-1}$ of the result generated in 1's complement, the carry C generated at the first fraction adder 301a, and the subtraction operation signal Sub generated at the controller.

According to that, Sub*(S*($S_{n-1}$*G)+S*(G+R+Sy)+C) is inputted into the first multiplexer 301e through the rounding-off mode selection circuit 404 of the rounding-off decision circuit 301f and enables the selection of the result value rounded off to negative infinity among the result values of the fraction outputted at the second and third exclusive OR-gates 301c and 301d.

In addition, when the MSB $S_{n-1}$ of the result generated in 1's complement is zero, the S0* to be shifted to the LSB is generated at the fourth shift value generating circuit 503 of the rounding-off shift value decision circuit 302a provided in the normalization circuit 302 shown in FIG. 9 and inputted into the rounding-off supplement circuit 302b of the normalization circuit 302 through the rounding-off mode selection circuit 504.

When the MSB $S_{n-1}$ of the result generated in 1's complement is zero the $S_0$* shifted to the LSB, incase of Round to Negative Infinity, is obtained through the shift value control generated at the second shift value generating circuit 500 and the logical operation of the Guard bit G, the Round bit R and the Sticky bit Sy, by the twenty sixth and the twenty seventh AND-gates 503a and 503b and the twenty seventh OR-gate 503c of the fourth shift value generating circuit 503.

The logic formula (S*G)+($\overline{S}$*($\overline{G}$*R)+($\overline{G}$*Sy)+(G* $\overline{R}$* $\overline{Sy}$) is generated and inputted into the rounding-off supplement circuit 302b.

In addition, the rounding-off supplement circuit 302b of the normalization circuit 302 supplements the result value of the fraction inputted from the first multiplexer 301e about Round to Nearest, Round to Zero, Round to Positive Infinity, and Round to Negative Infinity by means of the enabling signal, the operand control signal Op and the shift control signal generated at the rounding-off shift value decision circuit 302a.

Thus, the rounding-off supplement circuit 302b is enabled either when the carry C occurred during the addition operation or the MSB $S_{n-1}$ is zero during the subtraction operation.

During the addition operation, the operand control signal Op is zero and when the carry C is 1 among the value selected at the first multiplexer 301e by means of the rounding-off decision circuit 301f, the shift is executed to the right by 1 bit. Then the MSB becomes 1 and an increment signal is applied to add 1 to the second adder 302e.

During the subtraction operation, the value generated according to the Round to Nearest, Round to Zero, Round to Positive Infinity and Round to Negative Infinity at the rounding-off shift value decision circuit 302a is inserted into the LSB and inputted into the fraction normalization circuit 302f, while shifting 1 bit to the left.

The leading zero counter 302c counts the number of leading zero for the normalization from the fraction output value selected and inputted through the first multiplexer 301e, inputs the counted number into the fraction normalization circuit 302f and the second exponent adder 302e for the normalization of the fraction, and inputs into the second multiplexer 302d.

The second multiplexer 302d selects one value between the output value of the first exponent adder 300g of the data alignment circuit 300 and zero according to the selection signal inputted from the leading zero counter 302c and inputs it into the second exponent adder 302e.

The second exponent adder 302e subtracts the number of leading zeros of the leading zero counter 302c from the values selected through the second multiplexer 302d. The number of the maximum bit of the fraction in a double precision type is 53 bits, so the difference of the exponent is 6.

In case of expressing zero in the floating point operation, the sign bit S is zero, the exponent is zero, and the fraction is zero.

The zero in the floating point addition/subtraction operation means that the fraction after the addition/subtraction operation is zero.

However, in this case, the exponent can be any one of the other numbers except for zero.

Therefore, for processing the floating point number of zero when the output value of the fraction selected at the first multiplexer 301e is composed of zeroes and the guard bit G is zero, the leading zero counter 302c outputs zero as a counted value and the second multiplexer 302d selects zero and transfers zero to the second exponent adder. Thus the output value, the result of the exponent, of the second fraction adder 302e becomes zero.

In addition, the fraction normalization circuit 302f normalizes the output values of the fraction inputted from the rounding-off supplement circuit 302f in case of the subtraction, shifts as much as leading zeros inputted from the leading zero counter 302c, then outputs the result of the final fraction.

As described, the present invention presents an apparatus and methods thereof capable of concurrently performing the addition/subtraction in the fraction and the rounding-off, thereby not needing additional time for rounding-off, substantially overcoming the process of re-normalization, and decreasing the cost of manufacturing the hardware due to using simple logic adders without an additional adder for rounding-off and hardware of re-normalization.

What is claimed is:

1. A method for rounding-off in an apparatus for floating point addition/subtraction of first and second operands, each having a fraction portion and an exponent, comprising the steps of:

aligning the fraction portions of the first and second floating point operands based on a difference value of their exponents obtained by comparing the respective exponents of said first and second operands;

performing addition/subtraction operations between the aligned fraction portions and selectively outputting a result value of one of the addition/subtraction operations as a rounded-off result value in response to a result value of a first addition/subtraction operation and a predetermined one of four modes of rounding-off, the four modes including Round-to-Nearest, Round-to-Zero, Round-to-Positive Infinity and Round-to-Negative Infinity; and normalizing the rounded-off result value.

2. The method of claim 1, wherein said step of performing addition/subtraction operations decides a location of a rounding-off position in response to a carry value obtained during one of the addition/subtraction operations.

3. The method of claim 1, wherein said step of performing addition/subtraction operations includes a 1's complement operation, and said normalizing step decides whether a bit-shift in the rounded-off result value should be performed in response to a value of a MSB of a result generated in 1's complement during a subtraction operation.

4. The method of claim 1, wherein said addition/subtraction operations include a 1's complement and a 2's complement operation performed in parallel.

5. The method of claim 1, wherein for a subtraction operation, said normalization step shifts the rounded-off result value toward its more significant bit by 1 bit and inserts a rounding-off shift value into the LSB of the rounded-off result value in response to a rounding-off mode.

6. An apparatus for arithmetic addition/subtraction of first and second floating point operands, each having a fraction portion and an exponent, comprising:

data alignment means for aligning the fraction portions of the first and second operands based on a difference of their exponents obtained by comparing the respective exponents of the first and second operands;

addition/subtraction-and-rounding-off means for performing at least two addition/subtraction operations between the aligned fraction portions of the first and second operands, and for selectively outputting a result value of one of the addition/subtraction operations as a rounded-off result value in response to a rounding-off control signal so that said rounded-off result value is a rounded-off value of addition/subtraction of the fraction portions of the first and second operands; and normalization means for normalizing the rounded-off result value to output a final result.

7. The apparatus of claim 6, wherein said data alignment means comprises:

exponent comparator means for comparing the respective exponents of the first and second operands and for outputting a swap signal in accordance with said comparison, first swapper means for outputting the fraction portion of the first and second operands inputted thereto in response to said swap signal, second swapper means for aligning the exponents of the first and second operands inputted thereto from the exponent comparator in response to said swap signal, first exponent adder means for outputting a larger exponent among the exponents of the first and second operands aligned at the second swapper means and a difference value between the exponents of the first and second operands, fraction alignment means for shifting the fraction portion of one of the first and second operands which has a smaller exponent towards its least significant bit by a number of bits equal to the difference value outputted from the first adder exponent means and generating a Guard bit, a Round bit and a Sticky bit for a rounding-off, first exclusive OR-gate means for selectively passing or inserting the fraction portion of one of the first and second operands which has the larger exponent in response to an operation control value, and half-adder logic means for selectively passing a result value from the first exclusive OR-gate means and a result value of the fraction alignment means or acting as half adder upon the fraction portions of the first and second operands in response to a rounding-off mode set therein.

8. The apparatus of claim 7, wherein said addition/subtraction-and-rounding-off means comprises:

first fraction adder means for adding outputs of the half-adder logic means of the data alignment means and outputting a carry value, second fraction adder means for adding an output of the half-adder logic means and the value 1, second and third exclusive OR-gate means for outputting or by-passing an output of the first and second fraction adder means, respectively, in response to a result of logically ANDing an inverted value of the carry value with the operation control value, rounding-off decision means for generating the rounding-off control signal for determining a rounding-off operation, first multiplexer means for selecting one of output from the second and third exclusive OR-gate means based on the rounding-off control signal.

9. The apparatus of claim 8, wherein said rounding-off decision means comprises:

first rounding-off generating means for generating a first rounding-off control value for a Round-to-Nearest rounding-off in accordance with a MSB, LSB and a first bit of the output from the second exclusive OR-gate means the Guard bit, the Round bit, the Sticky bit, the carry value and an addition and subtraction operation value inputted from a controller, second rounding-off generating means for generating a second rounding-off control value for Round-to-Zero rounding-off in accordance with the Guard bit, the Round bit, the Sticky bit, the carry value and the subtraction operation value, third rounding off generating means for generating a third rounding-off control value for Round-to-Positive infinity rounding-off in accordance with the Round bit, the Sticky bit and the addition and subtraction operation values, the carry value, the MSB and the LSB and a sign bit of output from the first fraction adder means, fourth rounding-off generating means for generating a fourth rounding-off control value for a Round-to-Negative infinity rounding-off in accordance with the Guard bit, the Round bit, the Sticky bit, the subtraction operation value from the controller, the carry value, and the MSB and the sign bit, and rounding-off mode selection means for selecting one of the first, second, third, and fourth rounding-off control values generated at the first to fourth rounding-off generating means as the rounding-off control value.

10. The apparatus of claim 9, wherein said first rounding-off generating means generates the first rounding-off control value during an addition operation as $Add*(C*G*(S_0+R+S_y)+\overline{C}*S_0+(S_1+G+R+S_y))$, where Add is the addition operation value, C is the carry value, G is the Guard bit, $S_0$, is the LSB, R is the Round bit, Sy is the Sticky bit, and $S_1$ is the first bit.

11. The apparatus of claim 9, wherein said second rounding-off generating means generates the second rounding-off control value during an addition operation as zero.

12. The apparatus of claim 9, wherein said third rounding-off generating means generates the third rounding-off control value during an addition operation as $Add*(C*(S_0+G+R+S_y))$, where Add is the addition operation value, C is the carry value, $S_0$ is the LSB, G is the Guard bit, R is the Round bit, and Sy is the Sticky bit.

13. The apparatus of claim 9, wherein in said fourth rounding-off generating means generates the fourth rounding-off control value during an addition operation as zero.

14. The apparatus of claim 9, wherein said first rounding-off generating means generates the first rounding-off control value during a subtraction operation as $Sub*(\overline{S_{n-1}}*((R*S_y)+G)+S_{n-1}*((\overline{0}+G)+(G*Sy)+(G*R))+C)$, where Sub is the subtraction operation value, $S_{n-1}$ is the MSB R is the Round bit, Sy is the Sticky bit, G is the Guard bit, $S_0$ is the LSB and C is the carry value.

15. The apparatus of claim 9, wherein said second rounding-off generating means generates the second rounding-off control value operation as Sub*(G+R+Sy+C), where Sub is the subtraction operation value, G is the Guard bit, Sy is the Sticky bit, and C is the carry value.

16. The apparatus of claim 9, wherein said third rounding-off generating means generates the third rounding-off control value during a subtraction operation as Sub*($\overline{S}$*($\overline{S_{n-1}}$*G)+S*(G+R+Sy))+C, where Sub is the subtraction operation value, S is the sign bit, and $S_{n-1}$ is the MSB.

17. The apparatus of claim 9, wherein said fourth rounding-off generating means generates the fourth rounding-off control value during a subtraction operation as Sub*(S*($\overline{S_{n-1}}$*G)+S*(G+R+Sy)+C), where Sub is the subtraction operation value, S is the sign bit, $S_{n-1}$ is the MSB, G is the Guard bit, R is the Round bit, Sy is the Sticky bit, and C is the carry value.

18. The apparatus of claim 9, wherein said first rounding-off generating means generates the first rounding-off control value by performing a logical OR operation.

19. The apparatus of claim 9, wherein said third rounding-off generating means generates the third rounding-off value by performing a logical OR operation.

20. The apparatus of claim 6, wherein
said addition/subtraction operations include a 1's complement operation as one of the addition/subtraction operations, and said 1's complement operation generates a carry value; and
said normalization means includes,
rounding-off shift value decision means for generating a value to be shifted toward the LSB of the rounded-off result value in response to a rounding-off mode when a MSB of a result generated by the 1's complement operation is zero during a subtraction operation,
rounding-off complement means for complementing the rounded-off result value in response to a shift value toward the LSB of the rounded-off result value generated at the rounding-off shift value decision means, the carry value, and the operation control value, and for outputting an increment signal when the carry value indicates a shift value toward the MSB,
a leading zero counter means for outputting a counted value of leading zeroes in the rounded-off result value,
fraction normalization means for normalizing output of the rounding-off complement means during a subtraction operation in response to the counted value,
second multiplexer means for selecting a larger one of the exponents of said first and second operands and zero in response to the counted value, and
second exponent adder means for increasing output of the second multiplexer or subtracting the counted value from the output of the second multiplexer in response to the increment signal of the rounding-off complement means.

21. The apparatus of claim 9, wherein
said data alignment means generates a Guard bit, a Round bit, and a Sticky bit from a result of the aligning operation; and
said rounding-off shift value decision means includes,
first shift value generating means for generating a first rounding-off shift value for a Round-to-Nearest rounding-off in accordance with the Guard bit, the Round bit, and the Sticky bit,
second shift generating means for generating a second rounding-off shift value for Round-to-Zero rounding-off in accordance with the Guard bit, the Round bit and the Sticky bit,
third shift value generating means for generating a third rounding-off shift value for a Round-to-Positive infinity rounding-off in accordance with the Guard bit, the sign bit of output from the 1's complement operation, and the second rounding-off shift value generated at the second shift value generating means, and
fourth shift value generating means for generating a fourth rounding-off shift value or a Round-to-Negative infinity rounding-off in accordance with the Guard bit, the sign bit and the second rounding-off shift value generated by the second shift value generating means.

22. The apparatus of claim 21, wherein said first shift value generating means generates the first rounding-off shift value during a subtraction operation as (R*G)+(R*Sy*G), where R is the Round bit, G is the Guard bit, and Sy is the Sticky bit.

23. The apparatus of claim 22, wherein said shift value is shifted to the right when a MSB of a result generated by the 1's complement operation during a subtraction operation is zero.

24. The apparatus of claim 21, wherein said second shift value generating means generates the second rounding-off shift value during a subtraction operation as (G*R)+(G*Sy)+(G*R*Sy), where G is the Guard bit, R is the Round bit, and Sy is the Sticky bit.

25. The apparatus of claim 21, wherein said third shift value generating means generates the third rounding-off shift value during a subtraction operation as ($\overline{S}$*G)+S*($\overline{G}$*R)+(G*Sy)+(G*$\overline{R}$*$\overline{Sy}$), where S is the sign bit, G is the Guard bit, R is the Round bit, and Sy is the Sticky bit.

26. The apparatus of claim 21, wherein said fourth shift value generating means generates the fourth rounding-off shift value during a subtraction operation as (S*G)+($\overline{S}$*(($\overline{G}$*R)+($\overline{G}$*Sy)+(G*$\overline{R}$*$\overline{Sy}$)), where S is the sign bit, G is the Guard bit, R is the Round bit, and Sy is the Sticky bit.

27. The apparatus of claim 25, wherein said shift value is shifted to the right when a MSB of a result generated by the 1's complement operation during a subtraction operation is zero.

28. The apparatus of claim 9, wherein said rounding-off complement means is a bi-directional shifter.

29. The apparatus of claim 6, wherein register means for storing output are provided between each of the data alignment means, the addition/subtraction operation-and-rounding-off means and the normalization means for facilitating pipeline processing of the fraction portions and the exponents of the first and second operands.

30. A method for performing floating point addition/subtraction of first and second operands, the first operand having a first fraction portion and a first exponent, and the second operand having a second fraction portion and a second exponent, comprising:

(a) aligning the first and second fraction portions based on a comparison of the first and second exponents;

(b) performing a first type of addition/subtraction between the aligned first fraction portion and the aligned second fraction portion to produce a first result;

(c) performing a second type of addition/subtraction between the aligned first fraction portion and the aligned second fraction portion to produce a second result;

(d) selecting one of the first result and the second result as a rounded-off result based on a designated rounding mode; and (e) normalizing the rounded-off result.

31. The method of claim 30, wherein the designated rounding mode is one of a Round-to-Nearest mode, Round-to-Zero mode, Round-to-Positive Infinity mode, and a Round-to-Negative Infinity mode.

32. The method of claim 30, wherein the step (b) performs a 1's complement addition/subtraction operation.

33. The method of claim 32, wherein the step (c) performs a 2's complement addition/subtraction operation.

34. The method of claim 30, wherein the step (c) performs a 2's complement addition/subtraction operation.

35. The method of claim 30, wherein the step (a) generates a Guard bit, a Round bit and a Sticky bit based on one of the aligned first fraction portion and the aligned second fraction portion;

the step (b) generates a carry value based on the first type of addition/subtraction operation; and the step (d) selects one of the first result and the second result as the rounded-off result based on the designated rounding mode, the Guard bit, the Round bit, the Sticky bit, and the carry value.

36. The method of claim 35, wherein the step (d) selects one of the first result and the second result as the rounded-off result based on the designated rounding mode, the Guard bit, the Round bit, the Sticky bit, the carry value, a LSB of the first result, and a MSB of the first result.

37. The method of claim 30, wherein the step (e) includes the substeps of:

(e1) determining a shift direction; and (e2) normalizing the rounded-off result based on output of the step (e1).

38. The method of claim 37, wherein the step (b) generates a carry value based on the first type of addition/subtraction operation; and the step (e1) determines the shift direction based on the carry value and a MSB of the first result.

39. The method of claim 37, wherein the step (e) further includes the substeps of:

(e3) generating a round-off shift value; and (e4) shifting the round-off shift value into output from the step (e2) as a LSB of the output from the step (e2) when the step (e1) determines a shift direction towards a MSB of the rounded-off result.

40. The method of claim 39, wherein the step (a) generates a Guard bit, a Round bit and a Sticky bit based on one of the aligned first fraction portion and the aligned second fraction portion; and step (e3) generates the round-off shift value based on the Guard bit, the Round bit, and the Sticky bit.

41. An apparatus for performing floating point addition/subtraction of first and second operands, the first operand having a first fraction portion and a first exponent, and the second operand having a second fraction portion and a second exponent, comprising:

aligning means for aligning the first and second fraction portions based on a comparison of the first and second exponents;

first addition/subtraction means for performing a first type of addition/subtraction between the aligned first fraction portion and the aligned second fraction portion to produce a first result;

second addition/subtraction means for performing a second type of addition/subtraction between the aligned first fraction portion and the aligned second fraction portion to produce a second result;

selecting means for selecting one of the first result and the second result as a rounded-off result based on a designated rounding mode; and normalizing means for normalizing the rounded-off result.

42. The apparatus of claim 41, wherein the designated rounding mode is one of a Round-to-Nearest mode, Round-to-Zero mode, Round-to-Positive Infinity mode, and a Round-to-Negative Infinity mode.

43. The apparatus of claim 41, wherein the first addition/subtraction means performs a 1's complement addition/subtraction operation.

44. The apparatus of claim 43, wherein the second addition/subtraction means performs a 2's complement addition/subtraction operation.

45. The apparatus of claim 41, wherein the second addition/subtraction means performs a 2's complement addition/subtraction operation.

46. The apparatus of claim 41, wherein the aligning means generates a Guard bit, a Round bit and a Sticky bit based on one of the aligned first fraction portion and the second fraction portion;

the first addition/subtraction means generates a carry value based on the first type of addition/subtraction operation; and the selecting means selects one of the first result and the second result as the rounded-off result based on the designated rounding mode, the Guard bit, the Round bit, the Sticky bit, and the carry value.

47. The apparatus of claim 46, wherein the selecting means selects one of the first result and the second result as the rounded-off result based on the designated rounding mode, the Guard bit, the Round bit, the Sticky bit, the carry value, a LSB of the first result, and a MSB of the first result.

48. The apparatus of claim 41, wherein the normalizing means comprises:

shift determining means for determining a shift direction; and complement means for normalizing the rounded-off result based on output of the shift determining means.

49. The apparatus of claim 48, wherein the first addition/subtraction means generates a carry value based on the first type of addition/subtraction operation; and the shift determining means determines the shift direction based on the carry value and a MSB of the first result.

50. The apparatus of claim 48, wherein the normalizing means further comprises:

shift value generating means for generating a round-off shift value; and shifting means for shifting the round-off shift value into output from the complement means as a LSB of the output from the complement means when the shift determining means determines a shift direction towards a MSB of the rounded-off result.

51. The apparatus of claim 50, wherein the aligning means generates a Guard bit, a Round bit and a Sticky bit based on one of the aligned first fraction portion and the aligned second fraction portion; and the shift value generating means generates the round-off shift value based on the Guard bit, the Round bit, and the Sticky bit.

* * * * *